United States Patent
Itasaki et al.

(10) Patent No.: US 8,666,348 B2
(45) Date of Patent: Mar. 4, 2014

(54) NOISE CANCELING CONTROL APPARATUS, RECORDING MEDIUM, AND NOISE CANCELING CONTROL METHOD

(71) Applicant: Fujitsu Limited, Kawasaki (JP)

(72) Inventors: Akira Itasaki, Yokohama (JP); Shinichi Shiotsu, Kawasaki (JP); Koichi Yokota, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/734,309

(22) Filed: Jan. 4, 2013

(65) Prior Publication Data

US 2013/0122844 A1  May 16, 2013

Related U.S. Application Data

(63) Continuation of application No. PCT/JP2010/061911, filed on Jul. 14, 2010.

(51) Int. Cl.
*H04B 1/10* (2006.01)

(52) U.S. Cl.
USPC ...... 455/296; 455/226.1; 455/334; 455/550.1

(58) Field of Classification Search
USPC ........ 455/226.1–226.3, 296, 313, 334, 550.1, 455/552.1, 553.1
See application file for complete search history.

(56) References Cited

U.S. PATENT DOCUMENTS

| | | | |
|---|---|---|---|
| 5,812,673 A * | 9/1998 | Nohara et al. | 381/13 |
| 7,546,105 B2 * | 6/2009 | Piirainen | 455/278.1 |
| 8,315,583 B2 * | 11/2012 | Stelliga et al. | 455/296 |
| 8,369,789 B2 * | 2/2013 | Mashino et al. | 455/63.1 |
| 8,422,942 B2 * | 4/2013 | Sangiamwong et al. | 455/11.1 |
| 2009/0181632 A1 | 7/2009 | Shiba et al. | |
| 2009/0197558 A1 | 8/2009 | Shiotsu et al. | |

FOREIGN PATENT DOCUMENTS

| | | |
|---|---|---|
| JP | 08-116278 | 7/1996 |
| JP | 2001-144696 | 5/2001 |
| JP | 2009-171059 | 7/2009 |
| JP | 2009-188455 | 8/2009 |
| JP | 2009-253314 | 10/2009 |

OTHER PUBLICATIONS

International Search Report mailed Aug. 31, 2010 in PCT/JP2010/061911.

* cited by examiner

*Primary Examiner* — Nhan Le

(74) *Attorney, Agent, or Firm* — Staas & Halsey LLP

(57) ABSTRACT

A noise canceling control apparatus obtains information about current communication quality of a terminal, obtains a terminal state, obtains canceling parameters and data indicating the degree of a canceling effect from a holding unit configured to make an association among a terminal state, canceling parameters used when a canceling process is executed for a noise, and data indicating the degree of a canceling effect, and to record the terminal state, the canceling parameters, and the data, calculates communication quality when the canceling process is assumed to be executed for the terminal by using the obtained canceling parameters using the information about the current communication quality, and the data indicating the degree of the canceling effect, outputs canceling parameters with which the communication quality is predicted to be obtained, and executes the canceling process for the noise that occurs within the terminal by using the output canceling parameters.

11 Claims, 20 Drawing Sheets

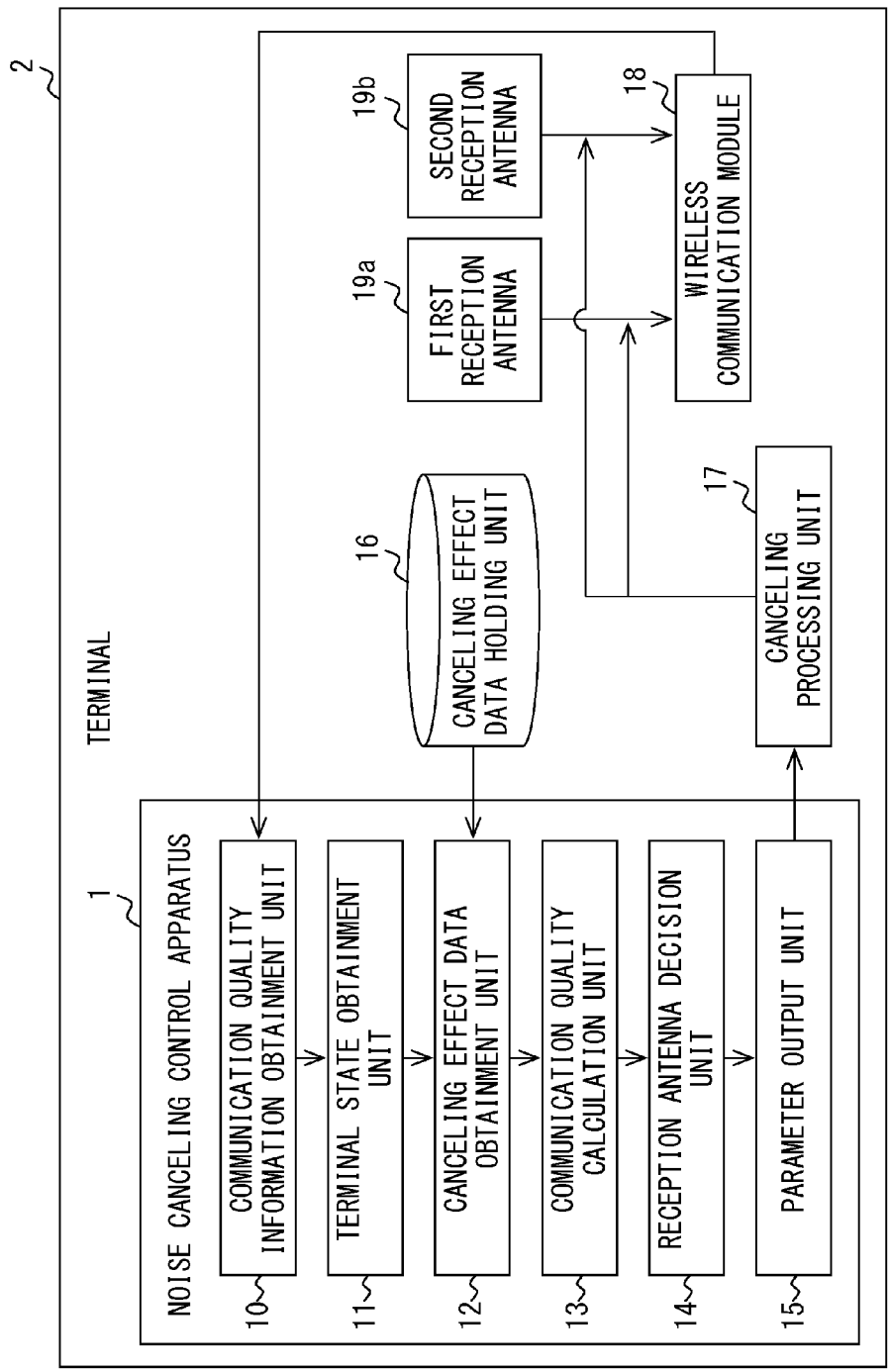
F I G. 1

| RECEPTION CHANNEL NO. | RUNNING APPLICATION | CANCELING EFFECT (dB) | | I VALUE | | Q VALUE | |
|---|---|---|---|---|---|---|---|
| | | RF1 | RF2 | RF1 | RF2 | RF1 | RF2 |
| 1ch | MOVING PICTURE REPRODUCTION | 10 | 20 | −495 | 763 | 158 | 930 |
| | BROWSER | 7 | 5 | 234 | 359 | 250 | −493 |
| | FILE TRANSFER | 15 | 10 | 232 | 248 | −166 | −102 |
| | OTHERS | 12 | 8 | −705 | −889 | −342 | −503 |
| 2ch | MOVING PICTURE REPRODUCTION | 12 | 15 | −483 | 694 | 394 | 203 |
| | BROWSER | 9 | 5 | 232 | 398 | 288 | −81 ⇐ 51 |
| | FILE TRANSFER | 20 | 16 | −495 | −428 | 763 | 697 |
| | OTHERS | 8 | 7 | −445 | −683 | −102 | 294 |
| ⋮ | ⋮ | ⋮ | ⋮ | ⋮ | ⋮ | ⋮ | ⋮ |
| Nch | MOVING PICTURE REPRODUCTION | 15 | 10 | −612 | 452 | −736 | 144 |
| | BROWSER | 3 | 8 | 124 | 235 | 154 | −603 |
| | FILE TRANSFER | 13 | 19 | −445 | −683 | −387 | −704 |
| | OTHERS | 2 | 5 | −555 | −234 | −95 | 359 |

FIG. 5

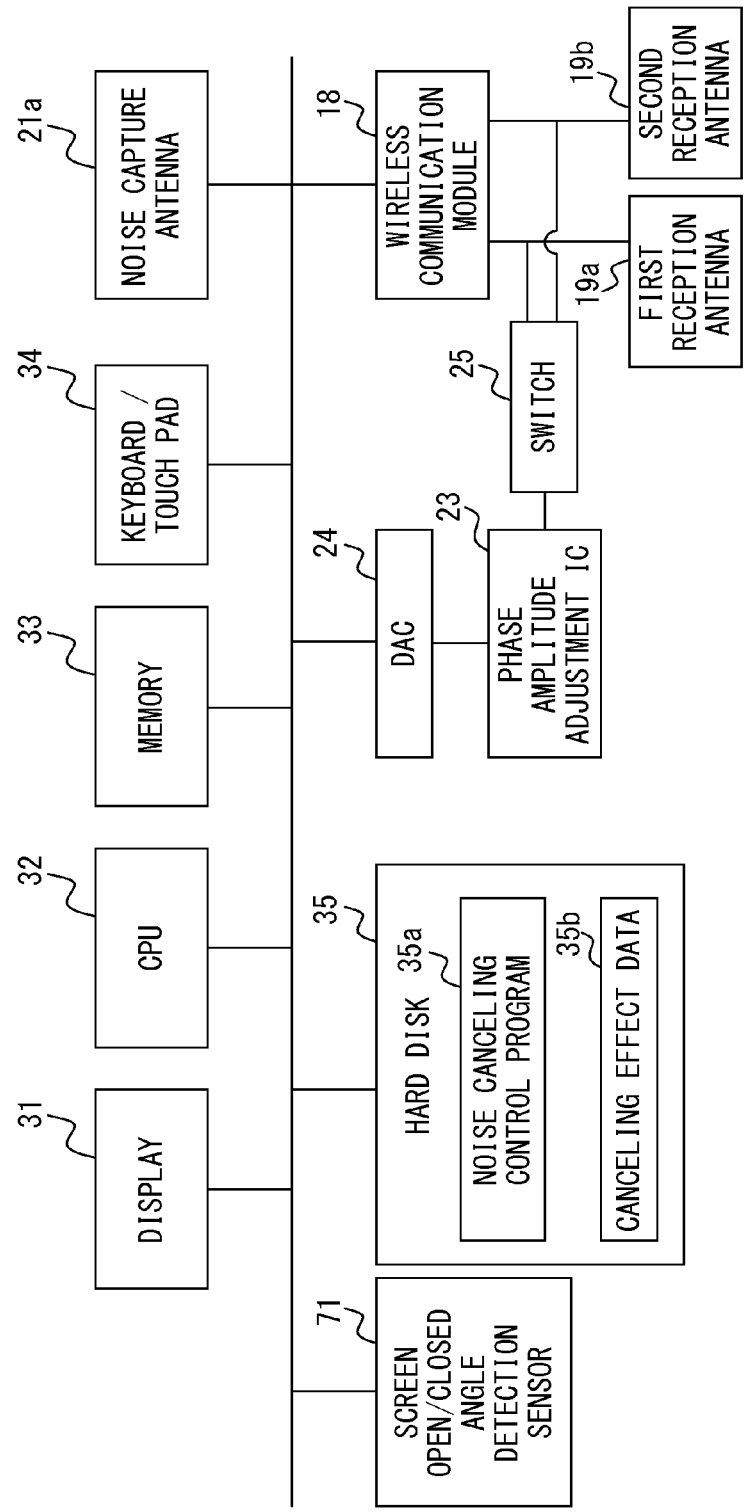
F I G. 7

| RECEPTION CHANNEL NO. | SCREEN OPEN / CLOSED ANGLE | CANCELING EFFECT (dB) | | I VALUE | | Q VALUE | |
|---|---|---|---|---|---|---|---|
| | | RF1 | RF2 | RF1 | RF2 | RF1 | RF2 |
| 1ch | 0 DEGREE (Tablet) | 10 | 20 | −495 | 763 | 158 | 930 |
| | 90 DEGREES (Laptop) | 15 | 10 | 234 | 359 | 250 | −493 |
| | 110 DEGREES (Laptop) | 12 | 8 | −705 | −889 | −342 | −503 |
| 2ch | 0 DEGREE (Tablet) | 10 | 15 | −483 | 694 | 394 | 203 |
| | 90 DEGREES (Laptop) | 8 | 7 | 232 | 398 | 288 | −81 |
| | 110 DEGREES (Laptop) | 8 | 7 | −445 | −683 | −102 | 294 |
| ⋮ | ⋮ | ⋮ | ⋮ | ⋮ | ⋮ | ⋮ | ⋮ |
| Nch | 0 DEGREE (Tablet) | 15 | 10 | −612 | 452 | −736 | 144 |
| | 90 DEGREES (Laptop) | 3 | 8 | 124 | 235 | 154 | −603 |
| | 110 DEGREES (Laptop) | 2 | 5 | −555 | −234 | −95 | 359 |

FIG. 8

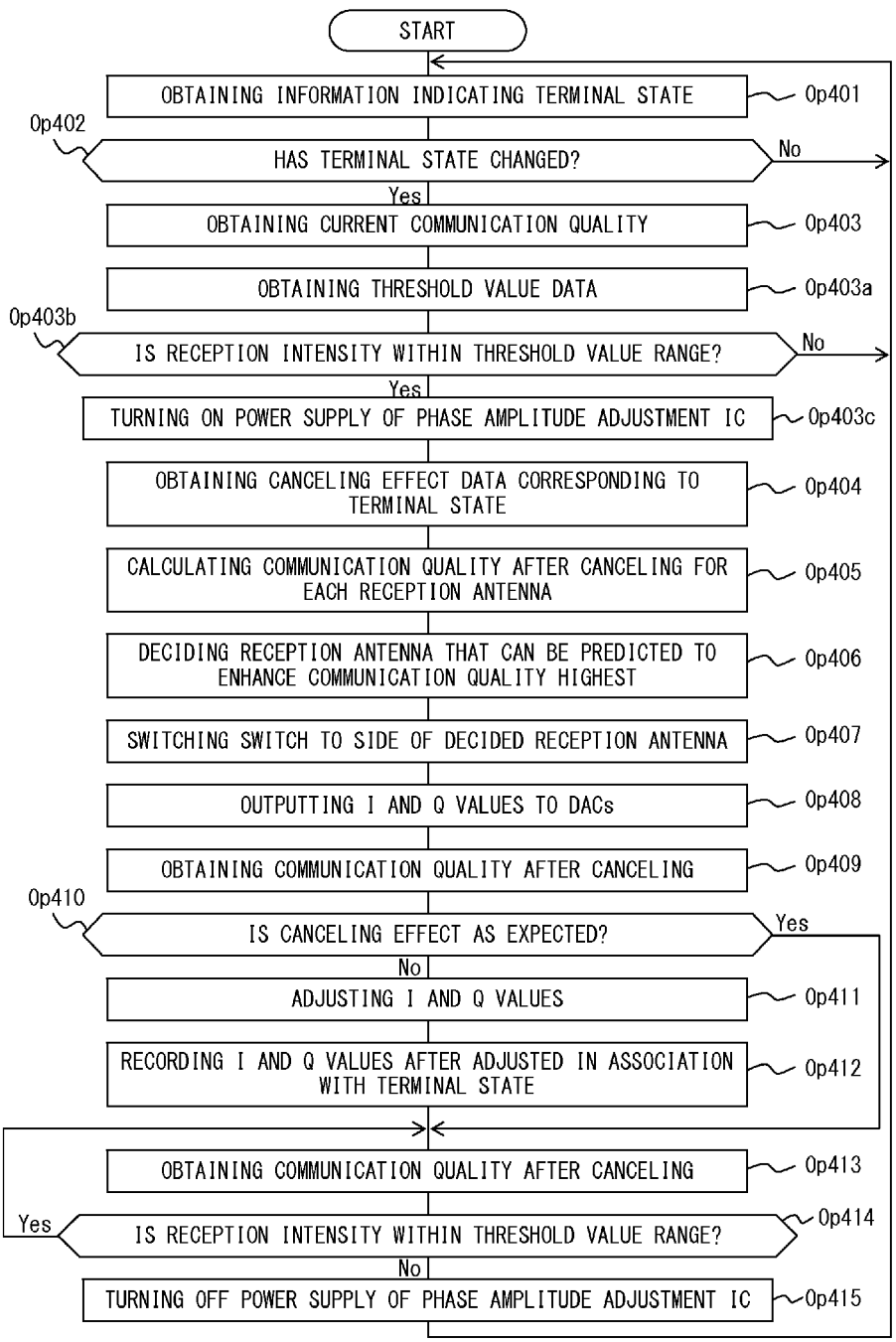
F I G. 1 1

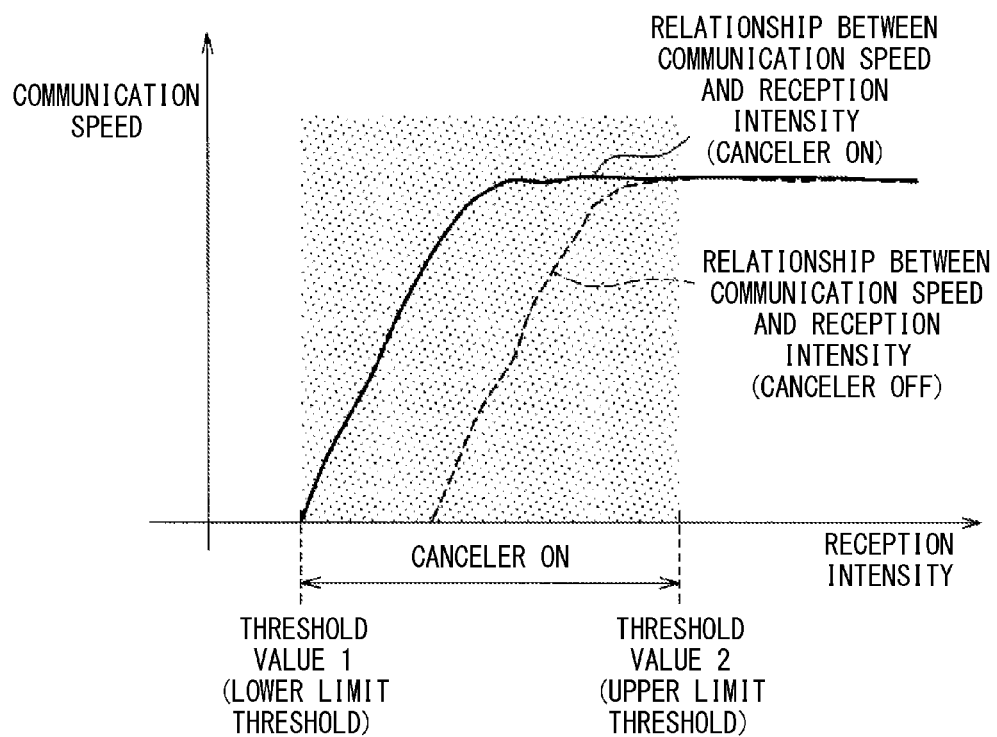
F I G. 1 2 A

| THRESHOLD VALUE 1 | THRESHOLD VALUE 2 |
|---|---|
| 5dB | 15dB |

⇐ 131

F I G. 1 3 A

| RUNNING APPLICATION | THRESHOLD VALUE 1 | THRESHOLD VALUE 2 | |
|---|---|---|---|
| MOVING PICTURE REPRODUCTION | 5dB | 20dB | ⇐ 132 |
| BROWSER | 5dB | 15dB | ⇐ 133 |
| ⋮ | 1dB | 10dB | |

F I G. 1 3 B

| PRIORITY | THRESHOLD VALUE 1 | THRESHOLD VALUE 2 | |
|---|---|---|---|
| COMMUNICATION SPEED | 5dB | 20dB | ⇐ 134 |
| POWER SAVING | 5dB | 10dB | ⇐ 135 |

F I G. 1 3 C

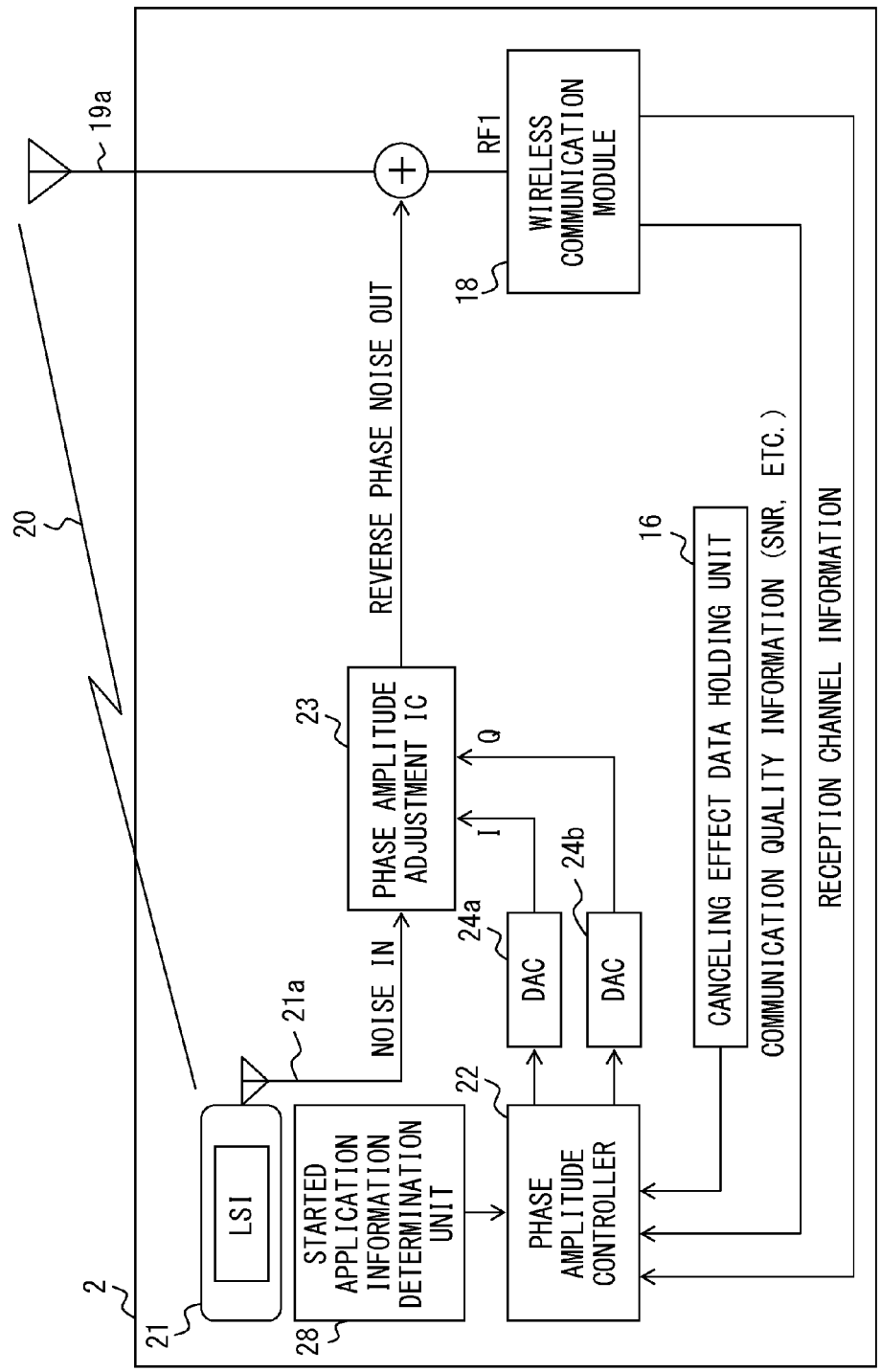
F I G. 15

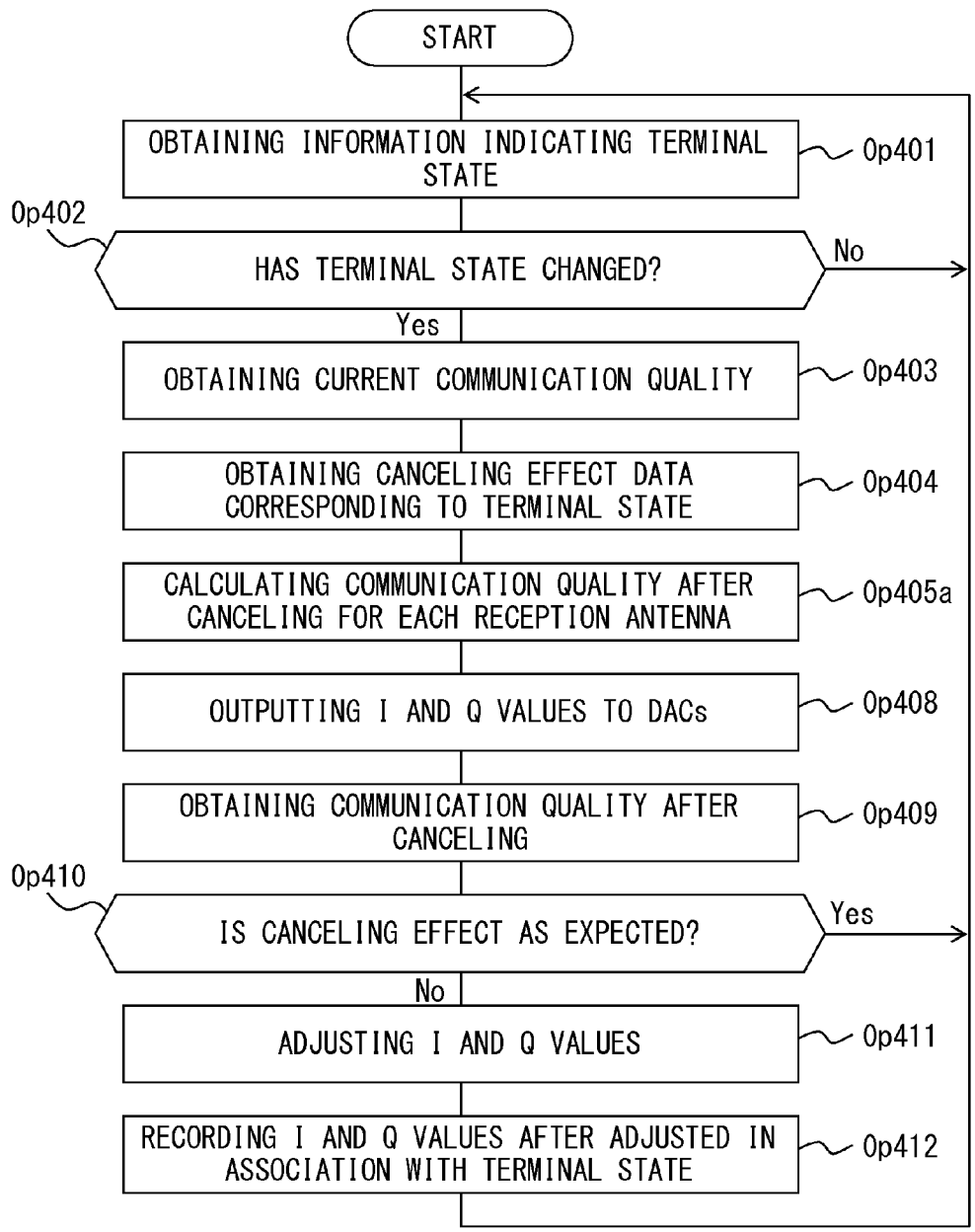
F I G. 16

| RECEPTION CHANNEL NO. | RUNNING APPLICATION | CANCEL EFFECT (dB) | I VALUE | Q VALUE |
|---|---|---|---|---|
| | | RF1 | RF1 | RF1 |
| 1ch | MOVING PICTURE REPRODUCTION | 10 | −495 | 158 |
| | BROWSER | 7 | 234 | 250 |
| | FILE TRANSFER | 15 | 232 | −166 |
| | OTHERS | 12 | −705 | −342 |
| 2ch | MOVING PICTURE REPRODUCTION | 12 | −483 | 394 |
| | BROWSER | 9 | 232 | 288 |
| | FILE TRANSFER | 20 | −495 | 763 |
| | OTHERS | 8 | −445 | −102 |
| ⋮ | ⋮ | ⋮ | ⋮ | ⋮ |
| Nch | MOVING PICTURE REPRODUCTION | 15 | −612 | −736 |
| | BROWSER | 3 | 124 | 154 |
| | FILE TRANSFER | 13 | −445 | −387 |
| | OTHERS | 2 | −555 | −95 |

FIG. 17

NOISE CANCELING CONTROL APPARATUS, RECORDING MEDIUM, AND NOISE CANCELING CONTROL METHOD

CROSS-REFERENCE TO RELATED APPLICATION

This application is a continuation application of International Application PCT/JP2010/061911 filed on Jul. 14, 2010 and designated the U.S., the entire contents of which are incorporated herein by reference.

FIELD

The present invention relates to a noise canceling control apparatus for canceling a noise that occurs within an electronic device or the like.

BACKGROUND

In recent years, a number of electronic devices equipped with a wireless communication module have been commercialized. Wireless communication module used for, by way of example, a wireless LAN (Local Area Network), WiMAX (Worldwide Interoperability for Microwave Access), or One Seg (a one-segment partial reception service intended for cellular phones and mobile terminals), etc. have been mounted in various types of electronic devices such as a notebook computer, a PDA (Personal Digital Assistant), a cellular phone, and the like.

A radiowave noise or the like that occurs within such electronic devices is received by a reception antenna connected to a wireless communication module, posing a problem such that communication quality is degraded (such as degradation of a transmission band, a communication disruption or the like) in some cases.

As a technique for solving this problem, a technique of canceling a radiowave noise (a noise canceling technique) by generating a signal of a reverse phase based on a radiowave noise captured in the neighborhood of a noise source and by adding the generated signal to a signal received by a reception antenna of a wireless function module is known (for example, see Patent Document 1).

Also a technique of executing a noise canceling process by holding in advance information of noise capture antennas and noise removal parameters according to a reception channel number or the like in a wireless communication module, and by using a noise capture antenna and noise removal parameters, which are suitable for a reception channel number or the like to be used, is known (for example, see Patent Document 2).

Patent Document 1: Japanese Laid-open Patent Publication No. 2001-144696
Patent Document 2: Japanese Laid-open Patent Publication No. 2009-188455

SUMMARY

A noise canceling control apparatus for a terminal having a reception antenna includes a communication quality information obtainment unit, a terminal state obtainment unit, a canceling effect data holding unit, a canceling effect data obtainment unit, a communication quality calculation unit, a parameter output unit, and a canceling processing unit. The communication quality information obtainment unit obtains information about current communication quality of the terminal. The terminal state obtainment unit obtains a terminal state of a terminal in which a canceling process for a noise that occurs within the terminal is to be executed. The canceling effect data holding unit makes an association among at least a terminal state, canceling parameters used when the canceling process is executed for the noise that occurs within the terminal, and data indicating a degree of a canceling effect when the canceling process is executed by using the canceling parameters, and records the terminal state, the canceling parameters, and the data. The canceling effect data obtainment unit obtains, from the canceling effect data holding unit, canceling parameters and data indicating the degree of a canceling effect, which correspond to the obtained terminal state. The communication quality calculation unit calculates communication quality when the canceling process is assumed to be executed for the terminal by using the obtained canceling parameters based on the information about the current communication quality, and the data indicating the degree of the canceling effect. The parameter output unit outputs canceling parameters with which the calculated communication quality is predicted to be obtained. The canceling processing unit executes the canceling process for the noise that occurs within the terminal by using the output canceling parameters.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates one example of a functional block diagram of a noise canceling control apparatus 1 according to an embodiment of the present invention.

FIG. 4 illustrates one example of an operation chart of a noise canceling control process based on a noise canceling control program 35a.

FIG. 5 illustrates one example of canceling effect data.

FIG. 7 illustrates an example of a hardware configuration of the terminal 2 that is illustrated in FIG. 6 and implemented by using a CPU.

FIG. 8 illustrates one example of canceling effect data.

FIG. 11 illustrates one example of an operation chart of a noise canceling control process based on a noise canceling control program 35a.

FIG. 12A illustrates a relationship between a communication speed and a reception intensity.

FIG. 13A illustrates a specific example of threshold values recorded in a reception intensity threshold value data holding unit 91.

FIG. 13B illustrates a specific example of threshold values recorded in the reception intensity threshold value data holding unit 91.

FIG. 13C illustrates a specific example of threshold values recorded in the reception intensity threshold value data holding unit 91.

FIG. 15 illustrates one example of a device configuration of a terminal 2 (a notebook computer device) configuring a noise canceling control apparatus 1 according to an another embodiment of the present invention.

FIG. 16 illustrates one example of an operation chart of a noise canceling control process based on a noise canceling control program 35a.

FIG. 17 illustrates one example of canceling effect data.

DESCRIPTION OF EMBODIMENTS

Figure 2:
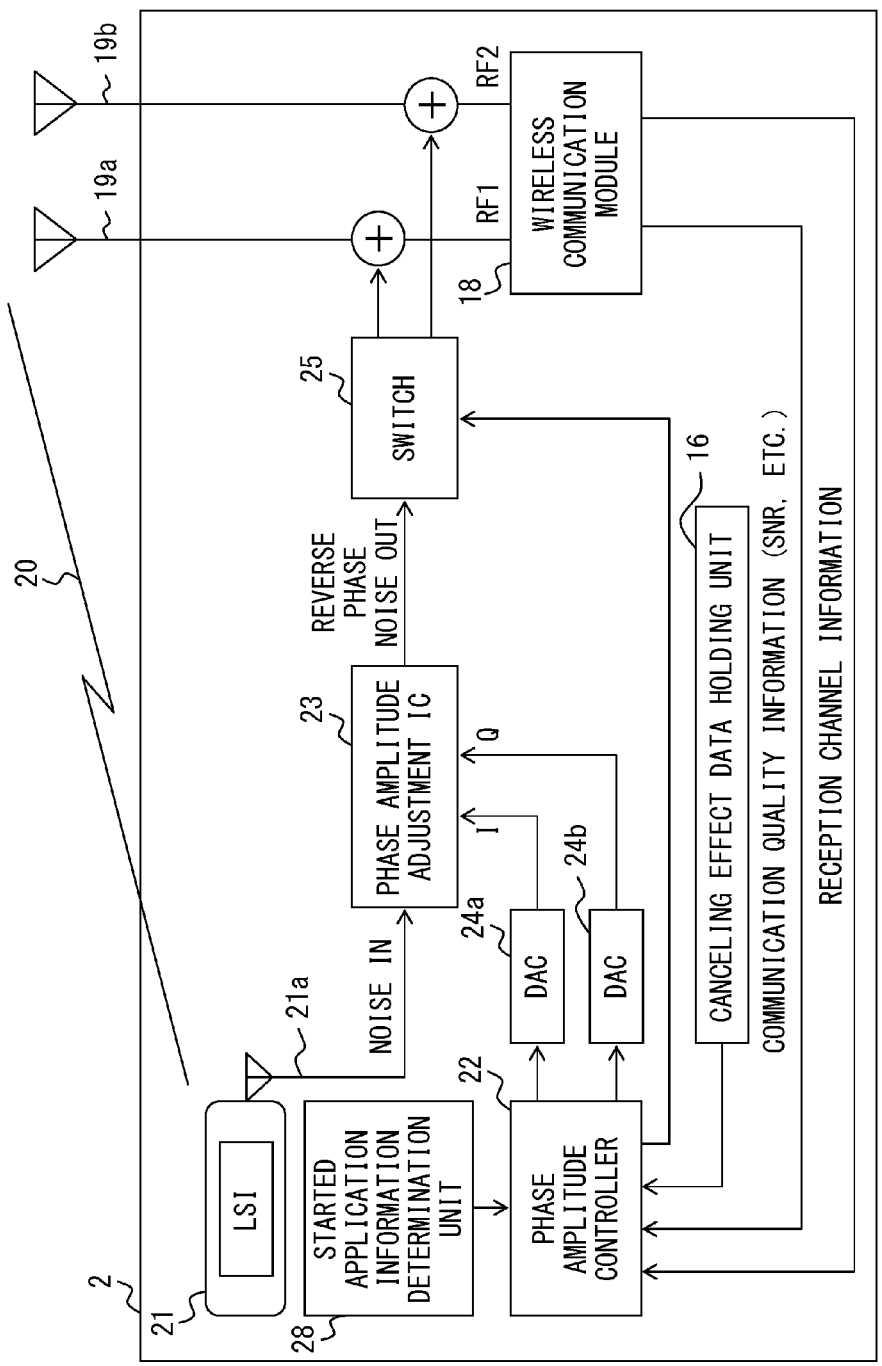
FIG. 2 illustrates one example of a device configuration of a terminal 2 (a notebook computer device) configuring the noise canceling control apparatus 1 according to the embodiment of the present invention.

Recent electronic devices equipped with a wireless communication module have adopted a configuration (diversity configuration) where a plurality of reception antennas for stabilizing communication quality are provided and a reception antenna of high communication quality is used with priority in many cases. In consideration of such a point, the above described conventional techniques have the following problems.

For example, the technique referred to in Patent Document 1 has a problem such that a cost rises with an increase in the number of antennas, each of which needs one noise canceling mechanism. Since the technique referred to in Patent Document 2 does not assume a case where a plurality of reception antennas connected to a communication function module are present, there is also a problem such that it is difficult to decide a condition for executing which canceling process for which of the reception antennas in a case where the plurality of reception antennas are provided.

The present invention was developed in light of the above described problems, and an object thereof is to provide a noise canceling control apparatus that can quickly decide a condition for achieving a noise canceling effect.

Embodiments according to the present invention are specifically described below with reference to the drawings.

1. FIRST EMBODIMENT 1-1. Example of Functional Blocks

FIG. 1 illustrates one example of a function block diagram of the noise canceling control apparatus 1 possessed by the terminal 2 according to this embodiment of the present invention. The noise canceling control apparatus 1 includes a communication quality information obtainment unit 10, a terminal state obtainment unit 11, a canceling effect data obtainment unit 12, a communication quality calculation unit 13, a reception antenna decision unit 14, and a parameter output unit 15.

The noise canceling control apparatus 1 is incorporated and used in the terminal 2. The terminal 2 is an electronic device or the like having a communication module 18 for implementing a communication function. The terminal 2 has a plurality of reception antennas (for example, a first reception antenna 19a and a second reception antenna 19b) connected to the communication module 18. The communication module 18 has a function (diversity) of using a reception antenna having the highest communication quality with priority among the plurality of reception antennas. FIG. 1 illustrates only two reception antennas (19a and 19b). However, three or more reception antennas may be provided.

The noise canceling control apparatus 1 can make an access to a canceling effect data holding unit 16 included in the terminal 2. The canceling effect data holding unit 16 makes an association among at least a terminal state, canceling parameters and data, and stores the terminal state, the canceling parameters and the data for each of the reception antennas. The terminal state indicates under which environment the terminal 2 is operating. The canceling parameters (for example, I and Q values) is used by a canceling processing unit for executing a noise canceling process uses to generate a noise signal of a reverse phase. The data indicates the degree of a canceling effect in a case where the canceling processing unit executes the canceling process by using the canceling parameters.

The noise signal of the reverse phase can be generated, for example, based on I and Q values (or a phase and an amplitude), which are canceling parameters, a target frequency, an amplification factor, or the like. For example, the phase and the amplitude of a signal waveform can be derived from the I and the Q values, and the I and the Q values can be derived from the phase and the amplitude of a signal waveform. Namely, a noise signal of a reverse phase can be generated if there is a pair of parameters, such as a pair of I and Q values, or a pair of a phase and an amplitude. The following explanation refers to an example where I and Q values are used to generate canceling parameters. However, the canceling parameters may be generated by using the phase and the amplitude of a signal waveform, a target frequency, an amplification factor, or the like other than the I and the Q values.

In the noise canceling control apparatus 1, the communication quality information obtainment unit 10 obtains various types of communication quality information from the wireless communication module 18. Examples of the various types of communication quality information include SNR (Signal-to-Noise Ratio) or BER (Bit Error Rate), which is calculated based on data currently being communicated, RSSI (Received Signal Strength Indication) indicating an intensity of a signal received by a device in a wireless communication of a wireless LAN or the like, and other types of information, for each of reception antennas.

In the noise canceling control apparatus 1, the terminal state obtainment unit 11 obtains a terminal state of the terminal 2 for which the canceling process is to be executed. Here, the terminal state indicates an operation environment of the terminal, such as a use state, a set state or the like, which can possibly influence a communication environment. Specific examples of the terminal state can include a reception channel of a wireless LAN, a type of a running application program, a processing function (such as a file transfer function) under execution, an open/closed angle (such as an open/closed angle of a display or an antenna in a case where the terminal 2 is a notebook computer) of a portion with which a movable portion makes contact if the terminal 2 has the movable portion.

In the noise canceling control apparatus 1, the canceling effect data obtainment unit 12 obtains, for each of the reception antennas, canceling parameters and data indicating the degree of a canceling effect, which correspond to the obtained terminal state, by referencing the canceling effect data holding unit 16. Examples of the canceling parameters include I and Q values (or a phase and an amplitude), a target frequency, an amplification factor, or the like used when a phase amplitude adjustment IC to be described later generates a noise signal of a reverse phase. The data indicating the degree of a canceling effect is, for example, a value (such as a decibel (dB) value when the communication quality is evaluated based on SNR) indicating the degree of a canceling effect that can be expected when the noise canceling process is executed with the noise signal of the reverse phase generated by using, for example, the I and the Q values.

In the noise canceling control apparatus 1, the communication quality calculation unit 13 calculates, for each of the reception antennas, communication quality in a case where the canceling process is assumed to be executed for the terminal by using the obtained canceling parameters based on the obtained data indicating the degree of the canceling effect. For example, the communication quality calculation unit 13 calculates, for each of the reception antennas, a value indicating communication quality after the noise canceling by determining to which degree the noise is reduced based on the value indicating the degree of the canceling effect. For example, SNR (Signal-to-Noise Ratio), BER (Bit Error Rate), CNR (Carrier-to-Noise Ratio), CIR (Carrier-to-Interference Ratio), or the like can be used as the value indicating the communication quality after the noise canceling is decided.

In the noise canceling control apparatus 1, the reception antenna 14 decides a reception antenna that can be predicted to enhance the calculated communication quality higher than the current communication quality. For example, a reception antenna that can be predicted to enhance the communication quality highest based on the calculated value (such as a decibel value) indicating the communication quality after the noise canceling.

In the noise canceling control apparatus 1, the parameter output unit 15 outputs, to the canceling processing unit 17, canceling parameters that are recorded in the canceling effect data holding unit 16 in association with the decided reception antenna. Namely, the parameter output unit 15 outputs the canceling parameters with which the calculated communication quality is predicted to be obtained to the canceling processing unit. The parameter output unit 15 outputs, for example, I and Q values (or a phase and an amplitude), a target frequency, an amplification factor, or the like of the reception antenna having the highest communication quality represented by a value indicating the degree of a canceling effect that can be expected when the noise canceling process is executed with a noise signal of a reverse phase. Upon receipt of the output, the canceling processing unit 17 generates a noise signal of a reverse phase based on the I and the Q values, and adds the noise signal of the reverse phase to a reception signal received by either of the reception antennas 19a and 19b. A radiowave noise is suitably removed from the reception signal received by the reception antenna by adding the noise signal of the reverse phase to the reception signal, so that the communication quality is improved.

In this way, the noise canceling control apparatus 1 according to this embodiment can quickly and safely decide a reception antenna having a high noise canceling effect.

The functional units (11 to 15) illustrated in the noise canceling control apparatus 1 of FIG. 1 include CPU functions respectively implemented by a program. Here, the program includes not only a program directly executable by a CPU but a source program, a compressed program, an encoded program, and the like.

1-2. Example of a Device Configuration

An example of a case where the terminal 2 including the noise canceling control apparatus 1 according to this embodiment is configured with a notebook computer device is described below. The terminal 2 including the noise canceling control apparatus 1 according to this embodiment may be configured with an electronic device, such as a cellular phone, a PDA (Personal Digital Assistant), or the like, having a wireless communication function using a plurality of antennas as a replacement for the notebook computer device.

FIG. 2 illustrates one example of configuration of the terminal 2 including the noise canceling control apparatus 1 according the embodiment of the present invention. The terminal 2 adopts a configuration of a diversity including a plurality of reception antennas (19a and 19b). FIG. 2 illustrates only two reception antennas (19a and 19b). However, three or more reception antennas may be provided. The reception antennas receive a noise 20 that occurs within the terminal 2 at the time of a communication performed by using these reception antennas, so that communication quality is degraded. To prevent the communication quality from being degraded, the terminal 2 according to this embodiment decides a reception antenna that enhances communication quality higher than the current communication quality, and executes a noise canceling process for a reception signal received by the decided reception antenna.

In FIG. 2, a noise capture antenna 21a receives a noise from an LSI 21 that can be a noise source, and inputs a signal of this noise to the phase amplitude adjustment IC 23 (noise IN). A plurality of noise sources may be present. If the plurality of noise sources are present, a noise capture antenna 21a may be provided for each of the noise sources or every several noise sources.

A started application information determination unit 28 obtains information about an application that is started and currently running in the terminal 2, and outputs the obtained information as information indicating a terminal state. The phase amplitude controller 22 obtains the information indicating a terminal state from the started application information determination unit 28. For example, if Windows (registered trademark) is used as an OS, the phase amplitude controller 22 may obtain information about a currently running application from a task manager.

Additionally, the phase amplitude controller 22 obtains communication quality information (such as SNR, BER, or the like) of each of the reception antennas from the wireless communication module 18. The phase amplitude controller 22 is equivalent to the noise canceling control apparatus 1 of FIG. 1. The phase amplitude controller 22 obtains reception channel information from the wireless communication module 18. For example, if the wireless communication module 18 is a wireless LAN system using a frequency channel of IEEE 802.11b, the phase amplitude controller 22 obtains reception channel information laid down according to a used band.

The phase amplitude controller 22 references the canceling effect data holding unit 16 based on the obtained information indicating a terminal state and reception channel information, and obtains information indicating a canceling effect for each of the reception antennas, and information of I and Q values in this case.

The phase amplitude controller 22 determines which of the reception antennas enhances the canceling effect highest. The phase amplitude controller 22 outputs the I and the Q values for executing the noise canceling process by using the predicted reception antenna to the phase amplitude adjustment IC 23 via DACs (Digital Analog Converters) 24a and 24b. Moreover, the phase amplitude controller 22 switches the switch 25 so that a noise signal of a reverse phase is added to the reception signal from the predicted reception antenna.

Upon receipt of the output, the phase amplitude adjustment IC 23 generates the noise signal of the reverse phase based on the I and the Q values, and outputs the generated signal to the switch 25 (reverse phase noise OUT). Upon receipt of the output, the switch 25 adds the noise signal of the reverse phase to the reception signal received by either of the reception antennas 19a and 19b. By adding the noise signal of the reverse phase to the reception signal, a radiowave noise is suitably removed from the reception signal received by the reception antenna, and communication quality using either of the reception antennas 19a and 19b is improved. The wireless communication module 18 executes the communication process by using a signal from the reception antenna having higher communication quality with priority.

In this way, a canceling effect in each of the reception antennas can be predicted in advance based on information indicating a canceling effect of canceling effect data, and I and Q values for obtaining the predicted canceling effect can be easily obtained and output. This eliminates the need for adjusting I and Q values needed to obtain a canceling effect, whereby a reception antenna having a high noise canceling effect can be quickly and safely decided and selected.

1-3. Example of a Hardware Configuration

Figure 3:
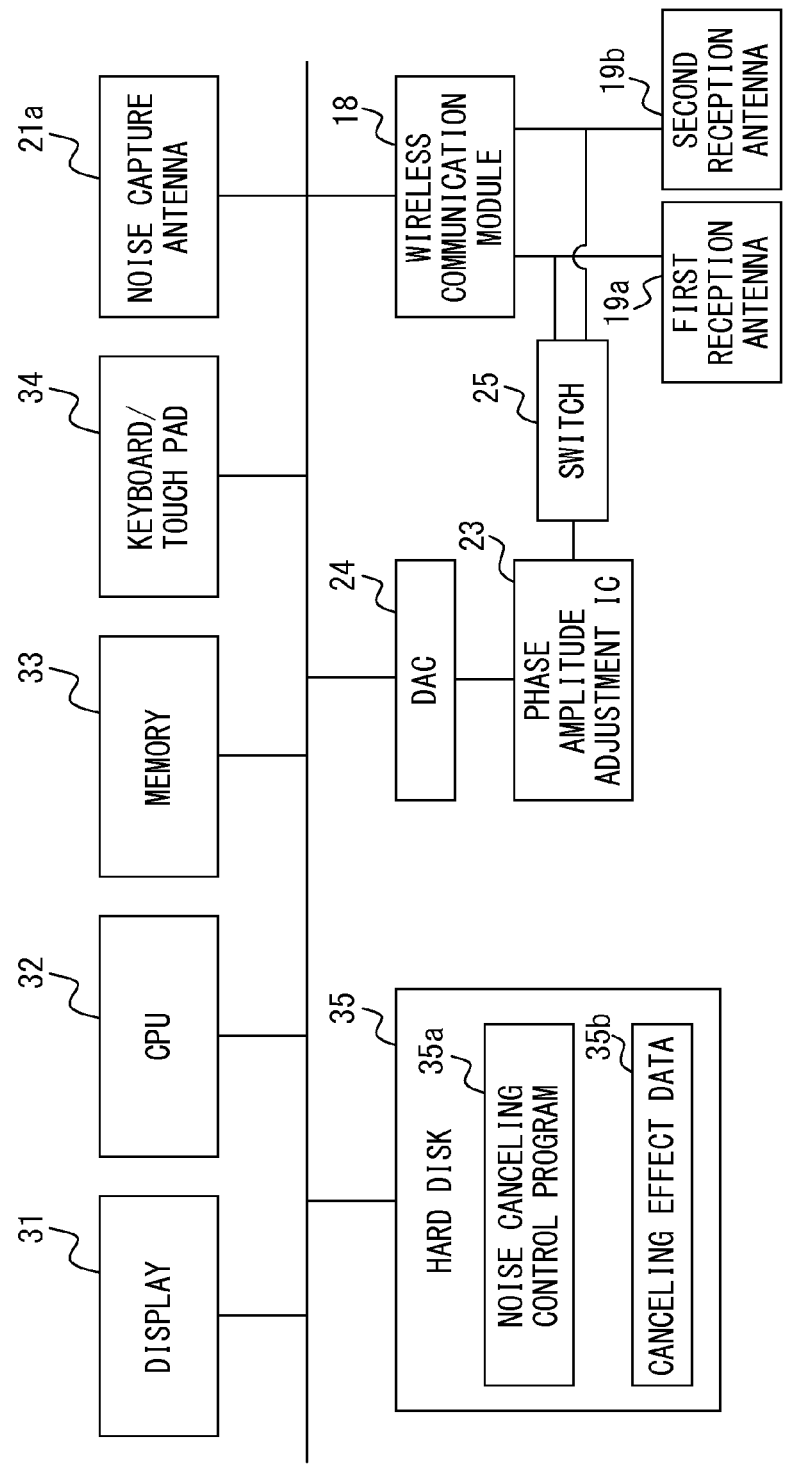
FIG. 3 illustrates one example of a hardware configuration of the terminal 2 that is illustrated in FIG. 2 and implemented by using a CPU.

FIG. 3 illustrates an example of a hardware configuration of the terminal 2 that is illustrated in FIG. 2 and implemented by using a computer device. The terminal 2 includes at least a display 31, a CPU 32, a memory 33, a keyboard/touch pad 34, a noise capture antenna 21a, a hard disk 35, the DACs (Digital Analog Converters) 24, the phase amplitude adjustment IC 23, the switch 25, the wireless communication module 18, the first reception antenna 19a, and the second reception antenna 19b. The terminal 2 may be configured by using another processor (such as an MPU or the like) or an IC (such as an ASIC or the like) as a replacement for the CPU 32.

On the hard disk 35, a noise canceling control program 35a, canceling effect data 35b, and the like are recorded in addition to an OS (Operating System not illustrated). All or any of the OS (Operating System not illustrated), the noise canceling control program 35a, and the canceling effect data 35b may be recorded in the memory 33.

The CPU 32 executes processes based on the OS, the noise canceling control program 35a, and the like. The wireless communication module 18 makes the terminal 2 connectable to the Internet or the like via a connection to a wireless LAN, WiMAX, or the like.

The terminal state obtainment unit 11, the canceling effect data obtainment unit 12, the communication quality calculation unit 13, the reception antenna decision unit 14, and the parameter output unit 15, which configure the noise canceling control apparatus 1 illustrated in FIG. 1, are implemented by executing the noise canceling control program 35a in the CPU 32.

1-4. Contents of a Noise Canceling Control Process

Figure 4:
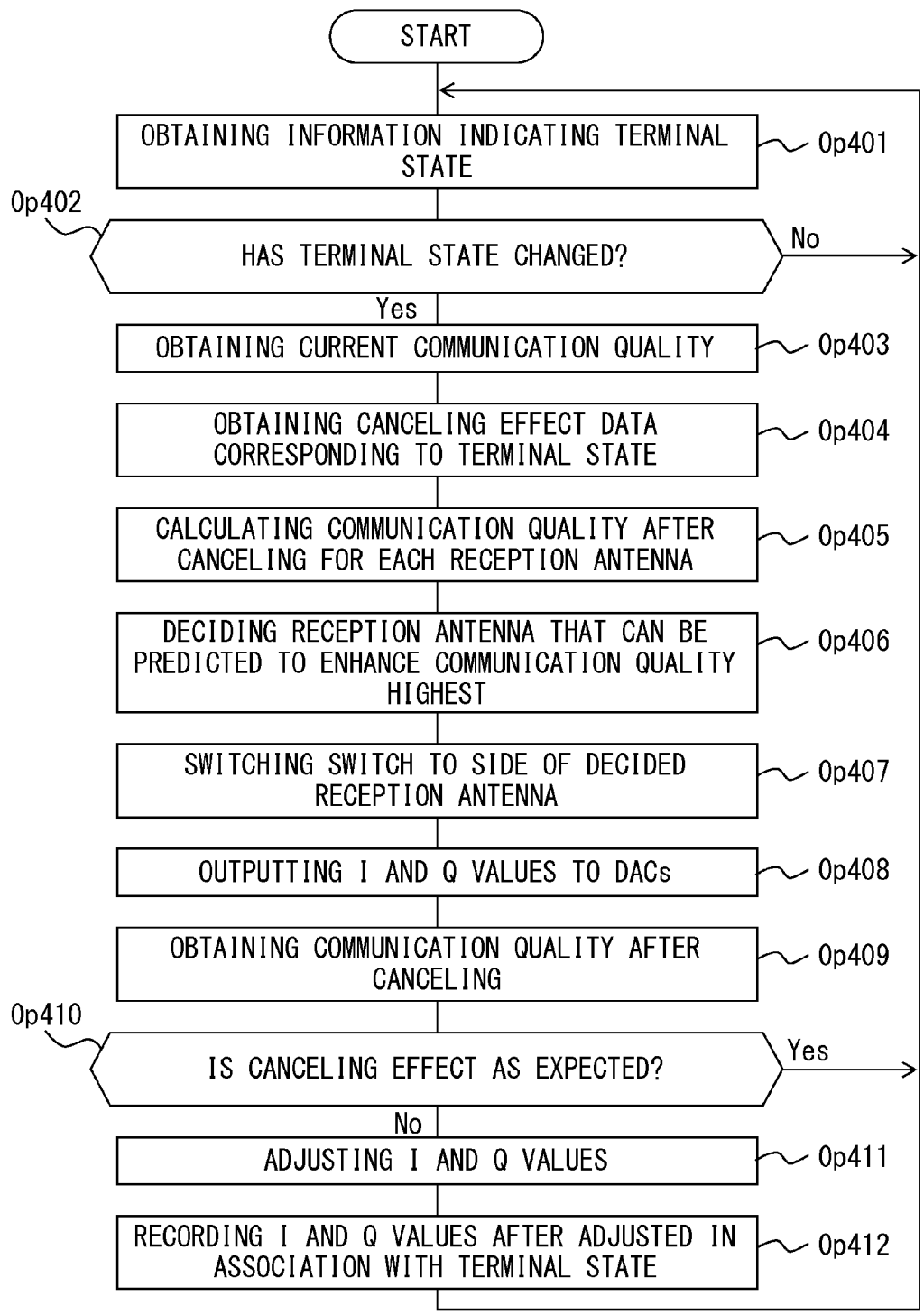

Contents of the process of the noise canceling control program 35a in the terminal 2 are described with reference to FIGS. 4 and 5 in addition to the above described FIGS. 1, 2, and 3. FIG. 4 illustrates one example of an operation chart of the noise canceling control process based on the noise canceling control program 35a. FIG. 5 illustrates one example of the canceling effect data 35b.

In the noise canceling control program of FIG. 4, the CPU 32 obtains information indicating a terminal state of the terminal 2 (Op 401). The CPU 32 obtains, for example, information of a reception channel "1ch" currently being used by a wireless LAN, and information of a currently running application program "browser" respectively as the information indicating the terminal state.

The CPU 32 determines whether or not the terminal state of the terminal 2 has changed (Op 402). The CPU 32 stores, for example, a terminal state obtained at the preceding time in the memory 33, and determines whether or not the terminal state has changed by comparing with the terminal state obtained at this time in Op 401. Specifically, the CPU 32 determines that the terminal state has changed if any of the information about the reception channel currently being used by the wireless LAN and the information of the currently running application program has changed. For example, if the information of the reception channel "1ch" currently being used by the wireless LAN has changed from "2ch", the CPU 32 determines that the terminal state has changed.

The CPU 32 obtains current communication quality of the terminal 2 (Op 403). The CPU 32 obtains, for example, SNR (Signal-to-Noise Ratio) for each of the reception antennas (19a and 19b) from the wireless communication module 18.

The CPU 32 obtains canceling effect data corresponding to the terminal state (Op 404). The CPU 32 obtains, for example, data of a record 51 in the canceling effect data 35b illustrated in FIG. 5. In this case, a reception channel number is "2ch", and the currently running application is "browser".

The CPU 32 calculates communication quality after the canceling for each of the reception antennas (Op 405). Namely, the CPU 32 calculates, for each of the reception antennas, a predicted value of the communication quality after the canceling based on the canceling effect data 35b. For example, if SNRs that have been obtained in the above described Op 404 and indicate the communication quality of the first and the second reception antennas are respectively "10 dB" and "12 dB", predicted values of the communication quality of the first reception antenna and the second reception antenna after the canceling are respectively calculated to be 19 dB (=10 dB+9 dB) and "17 dB (=12 dB+5 dB)". This is because the canceling effect data of the first reception antenna (RF1) and the second reception antenna (RF2) in the above described record 51 (FIG. 5) are "9 dB" and "5 dB", respectively.

The CPU 32 decides a reception antenna that can be predicted to enhance the communication quality highest (Op 406). The predicted values of the communication quality of the first reception antenna and the second reception antenna after the canceling, which have been calculated in the above described Op 405, are, for example, "19 dB (=10 dB+9 dB)" and "17 dB (=12 dB+5 dB)", respectively. Therefore, the CPU 32 decides the first reception antenna (19 dB) having the higher predicted value (dB) as the antenna that can be predicted to enhance the communication quality highest. Normally, an influence of a noise in a transmission decreases with an increase in the value of SNR. Therefore, the communication quality becomes higher.

The CPU 32 switches the switch 25 to the side of the reception antenna decided in the above described Op 406 (Op 407). By switching the switch 25, a noise signal of a reverse phase output from the phase amplitude adjustment IC 23 is added to a reception signal received by the reception antenna decided in the above described Op 406.

The CPU 32 outputs the I and the Q values to the DACs (Digital Analog Converters) 24a and 24b (Op 408). For example, the output I and Q values are converted from a digital signal into an analog signal by the DACs 24, and input to the phase amplitude adjustment IC 23. The phase amplitude adjustment IC 23 generates a noise signal of a reverse phase based on the input I and Q values, and outputs the generated signal to the switch 25. In this way, the noise signal of the reverse phase is added to the reception signal received by the reception antenna provided on the side switched by the switch 25, so that noise canceling is performed for the reception signal.

The CPU 32 obtains communication quality after the noise canceling (Op 409). The CPU 32 obtains, for example, SNR based on communication data respectively received by the reception antennas similarly to the above described Op 403.

The CPU 32 determines whether or not a canceling effect is as expected based on the communication quality after the noise canceling, which has been obtained in the above described Op 409, and the predicted value of the first reception antenna, which has been predicted in the above described Op 406 (Op 410). For example, if the predicted value of the first reception antenna, which has been predicted in the above described Op 406, is "19 dB", the CPU 32 makes a comparison between obtained actual communication quality and the predicted value "19 dB" of the first reception antenna.

If the obtained actual communication quality and the predicted value of the first reception antenna are close (for example, if a difference between the communication quality and the predicted value is within a specified range) as a result of the comparison, the CPU 32 determines that the noise canceling effect is as expected ("YES" in Op 410). Then, the process returns to the above described Op 401, in which the CPU 32 similarly repeats the process. If the obtained actual communication quality and the predicted value of the first reception antenna are not close (for example, if the difference between the communication quality and the predicted value is not within the specified range), the CPU 32 determines that the noise canceling effect is not as expected ("NO" in Op 410), and adjusts the I and the Q values (Op 411).

For example, if the above described specified range is set to "1 dB", and if the predicted value and the actual communication quality of the first reception antenna are respectively "19 dB" and "18 dB", the difference between the predicted value and the actual communication quality is determined to be within the specified range based on a difference "1 dB" between them. In contrast, if the predicted value of the first reception antenna is "19 dB", and if the actual communication quality of the first reception antenna is "17 dB", the CPU 32 determines that the difference is not within the specified range based on a difference "2 dB" between them.

When the CPU 32 adjusts the I and the Q values in the above described Op 411, it outputs suitable I and Q values by adjusting these values so that the noise canceling effect increases as in the conventional techniques. Namely, the CPU 32 (1) switches the switch 25 to the side of the reception antenna 19a (RF1), obtains optimum communication quality by adjusting the I and the Q values, (2) switches the switch 25 to the side of the reception antenna 19b (RF2), obtains optimum communication quality by adjusting the I and the Q values, and (3) makes a comparison between the optimum communication quality of the reception antenna 19a (RF1) and the reception antenna 19b (RF2), switches the switch 25 to add a noise signal of a reverse phase to a reception signal from the reception antenna having the higher communication quality, and outputs the I and the Q values suitable for the reception antenna having the higher communication quality to the phase amplitude adjustment IC 23.

The CPU 32 records the I and the Q values after adjusted in the above described Op 411 as canceling effect data in association with a terminal state (Op 412). In this case, the CPU 32 may update I and Q values in data records related to the same terminal state, or add a new data record. In this way, I and Q values after adjusted are recorded as canceling effect data in association with a terminal state, whereby accuracy of canceling parameters recorded in records of canceling effect data can be improved. Namely, canceling parameters (I and Q values) having a high canceling effect are recorded in association with a terminal state, whereby the CPU 32 can quickly and safely execute the noise canceling process at subsequent times.

1-5. Comparison Example

Figure 14:
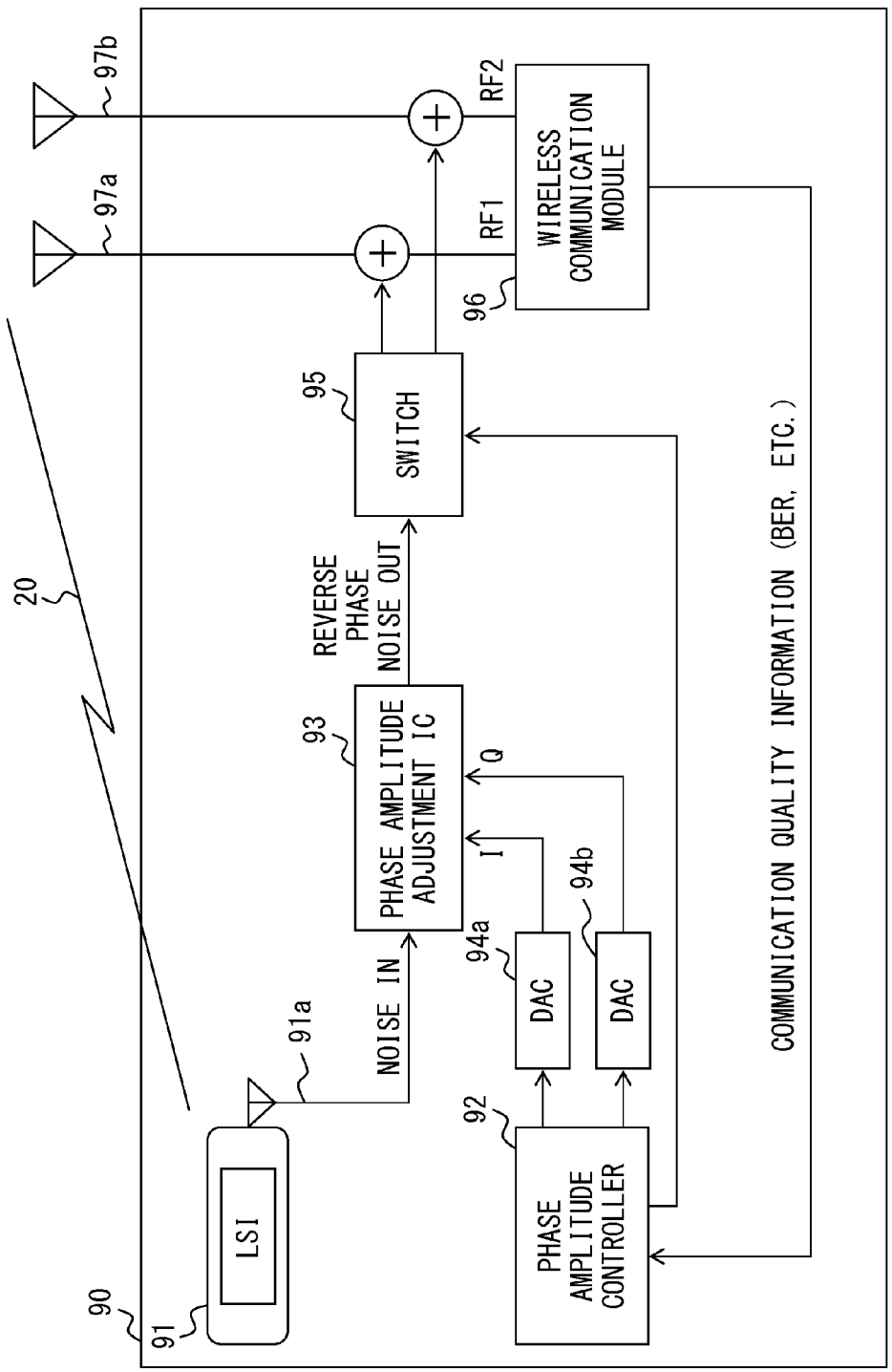
FIG. 14 illustrates one example of a case where a noise canceling process is executed for a reception antenna having a high noise canceling effect when a terminal 90, which is an electronic device, adopts a configuration of a diversity including a plurality of reception antennas.

FIG. 14 illustrates one example of a case where the noise canceling process is executed for a reception antenna having a high noise canceling effect if a terminal 90, which is an electronic device, adopts a configuration of a diversity including a plurality of reception antennas.

In the example illustrated in FIG. 14, a noise capture antenna 91a receives a noise from an LSI 91, which can be a noise source, and inputs a signal of this noise to a phase amplitude adjustment IC 93. A phase amplitude controller 92 outputs I and Q values to the phase amplitude adjustment IC 93 via DACs (Digital Analog Converters) 94a and 94b. Upon receipt of the output, the phase amplitude adjustment IC 93 generates a noise signal of a reverse phase based on the I and the Q values, and outputs the generated signal to the switch 95. Upon receipt of the output, the switch 95 adds the noise signal of the reverse phase to a reception signal received by either of reception antennas 97a and 97b.

Namely, the terminal 90 of FIG. 14 attempts to suitably remove a radiowave noise from a reception signal received by the reception antenna with a noise signal of a reverse phase that optimizes communication quality information (such as SNR (Signal-to-Noise Ratio), BER (Bit Error Rate), or the like) output from a wireless communication module 96.

In the above described case, the phase amplitude controller 92 outputs suitable I and Q values by adjusting them to increase a noise canceling effect. The phase amplitude controller 92 outputs suitable I and Q values, for example, with the following method.

(1) Switches the switch 95 to the side of the reception antenna 97a (RF1), and obtains optimum communication quality by adjusting the I and the Q values.

(2) Switches the switch 95 to the side of the reception antenna 97b (RF2), and obtains optimum communication quality by adjusting the I and the Q values.

(3) Makes a comparison between optimum communication quality of the reception antennas 97a (RF1) and 97b (RF2), switches the switch 95 to add a noise signal of a reverse noise to a reception signal from the reception antenna having higher communication quality, and outputs the I and the Q values suitable for the reception antenna having the higher communication quality to the phase amplitude adjustment IC 93.

When the I and the Q values are adjusted in the above described (1) and (2), the communication quality needs to be determined with an experimental method (a so-called round-robin method) while suitably changing the I and the Q values. Accordingly, there is a problem such that a considerable amount of time is needed to adjust the I and the Q values (canceling parameters) when the canceling process is executed by using each antenna, causing a delay of the canceling process as a whole. There is also a risk of a communication disruption due to degradation of communication quality while the I and the Q values are being adjusted.

Unlike this comparison example, a reception antenna having a high noise canceling effect can be quickly and safely decided without adjusting the I and the Q values (canceling parameters) according to the above described embodiment.

1-6. Modification Example

The above described Op 405 refers to the example where the predicted value of communication quality after the canceling is calculated by using SNR as communication quality. However, the predicted value may be calculated by using communication quality other than SNR. A case where the predicted value is calculated, for example, by using BER is described below.

Assume that reception sensitivities of the first reception antenna and the second reception antenna are respectively "−100 dbm" and "−95 dbm" in a case where BER is percent. Also assume that reception sensitivities as predicted values after the canceling are respectively calculated to be "−106 dbm" and "−99 dbm". In this case, assuming that the current reception sensitivities of the first reception antenna and the second reception antennas are respectively "−85 dbm" and "−88 dbm", margins of the current reception sensitivities of the first reception antenna and the second reception antenna are respectively "15 db" and "7 db", whereas margins of the reception sensitivities after the canceling are respectively calculated to be "21 db" and "11 db". Accordingly, the first reception antenna after the canceling, which maximizes the margin of the reception sensitivity, is decided as a reception antenna that can be predicted to enhance the communication quality highest.

1-7. Summary

As described above, the aforementioned noise canceling control apparatus calculates the predicted value of communication quality after the canceling for each of the reception antennas based on the canceling effect data 35b, decides a reception antenna that can be predicted to enhance communication quality highest, and outputs I and Q values, which are canceling parameters, to the phase amplitude adjustment IC 23, so as to add a noise signal of a reverse phase to a reception signal received by the decided reception antenna, so that the noise canceling process is controlled. As a result, noise canceling for a reception signal can be suitably performed by using the noise signal of the reverse phase. Accordingly, an additional cost incurred with an increase in the number of reception antennas can be prevented, and a reception antenna that achieves a high noise canceling effect can be quickly and safely decided.

In this embodiment, the terminal state obtainment unit 11 includes, for example, the process function of Op 401 illustrated in FIG. 4. The canceling effect data obtainment unit 12 includes, for example, the process function of Op 404 illustrated in FIG. 4. The communication quality calculation unit 13 includes, for example, the process function of Op 405 illustrated in FIG. 4. The reception antenna decision unit 14 includes, for example, the process function of Op 406 of FIG. 4. The parameter output unit 15 includes, for example, the process function of Op 408 illustrated in FIG. 4.

2. SECOND EMBODIMENT

The above described embodiment refers to the example where information about a currently running application program is used as a terminal state. The second embodiment refers to an example where a noise canceling process is executed by using, as a terminal state, information about a relative position relationship (such as an open angle formed between a display plane and a keyboard plane) between a movable portion and a fixed portion of a terminal. For example, in a notebook computer device, a plurality of communication antennas are embedded in different positions in an outer frame of a display, which is a movable portion. Therefore, influences exerted by an internal noise of a main body, which is a fixed portion, respectively on reception antennas on the side of the display vary depending on an open/closed state of the display.

Also a noise canceling control apparatus according to this embodiment can be configured by using an electronic device such as a notebook computer device, a cellular phone, a PDA or the like similarly to the first embodiment.

2-1. Functional Block, Apparatus Configuration and Hardware Configuration

One example of a functional block, an apparatus configuration, and a hardware configuration of the noise canceling control apparatus 1 according to this embodiment is basically similar to the first embodiment described with reference to FIGS. 1, 2, and 3.

Figure 6:
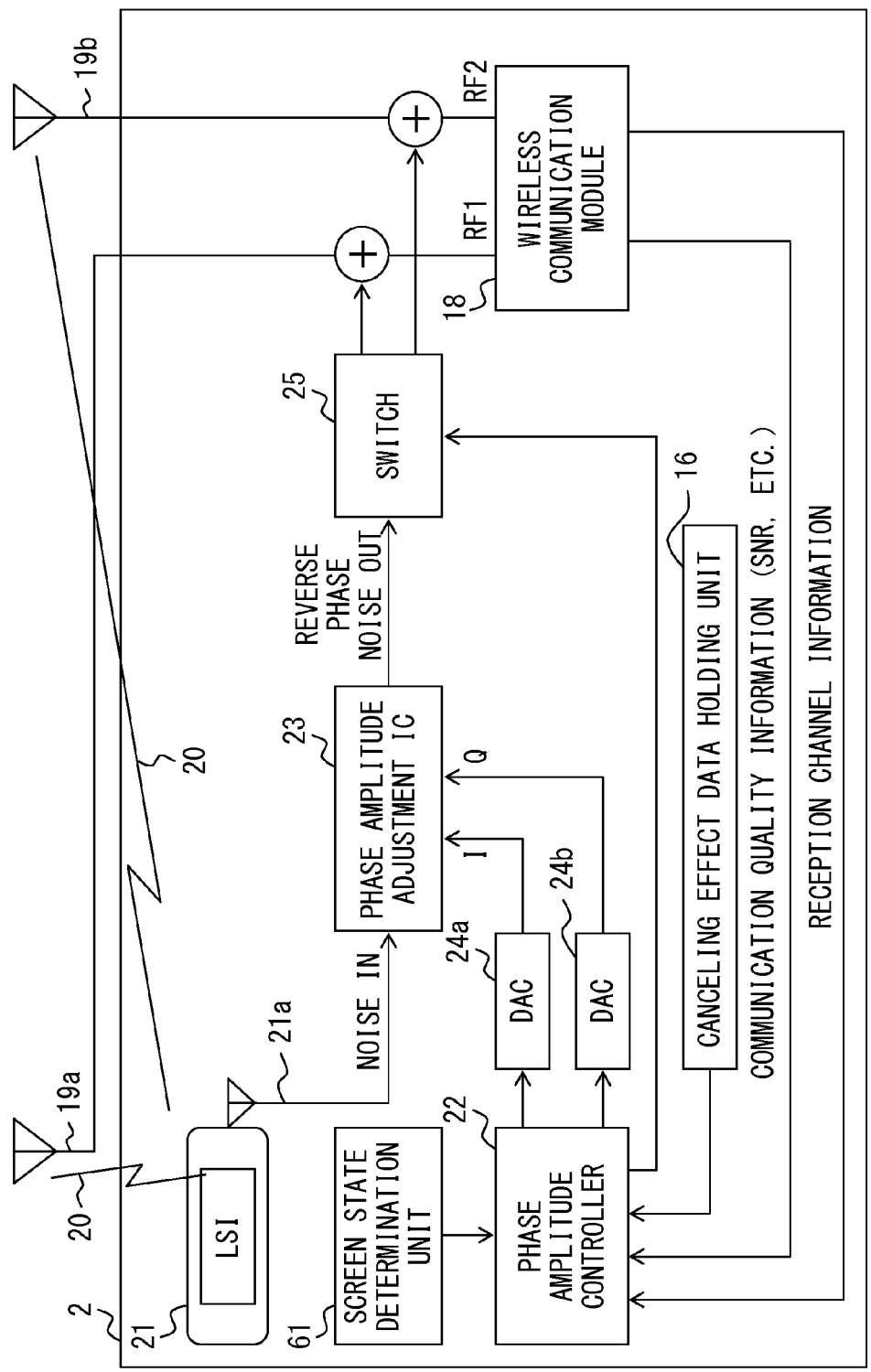
FIG. 6 illustrates one example of a device configuration of a terminal 2 (a notebook computer device) configuring a noise canceling control apparatus 1 according to the second embodiment of the present invention.

FIG. 6 illustrates one example of a device configuration of a terminal 2 (a notebook computer device) that configures the noise canceling control apparatus 1 according to this embodiment of the present invention. In FIG. 6, a screen state determination unit 61 is added to the configuration of FIG. 2. The screen state determination unit 61 obtains information about an open/closed angle formed between a display plane and a keyboard plane in the terminal 2, and outputs the obtained information to the phase amplitude controller 22 as part of information indicating a terminal state.

FIG. 7 illustrates an example of a hardware configuration of the terminal 2 that is illustrated in FIG. 6 and implemented by using a CPU. In FIG. 7, a screen open/closed angle detection sensor 71 is added to the configuration of FIG. 3. The screen open/closed angle detection sensor 71 detects an open/closed angle formed between the display plane and the keyboard plane of the terminal 2 based on a physical state of a hinge portion that links the main body (fixed portion) and the display 31 (movable portion) of the notebook computer device.

2-2. Contents of a Noise Canceling Control Process

Contents of a process of a noise canceling control program 35a in the terminal 2 according to this embodiment are basically similar to the first embodiment described with reference to FIG. 4. Namely, the first embodiment and the second embodiment are identical in that the CPU 32 obtains information indicating a terminal state of the terminal 2 (Op 401), determines whether or not the terminal state of the terminal 2 has changed (Op 402), obtains current communication quality of the terminal 2 if the terminal state has changed (Op 403), obtains canceling effect data corresponding to the terminal state (Op 404), calculates communication quality after the canceling for each of the reception antennas (Op 405), decides a communication antenna that can be predicted to enhance the communication quality highest (Op 406), switches the switch 25 to the side of the decided reception antenna (Op 407), and outputs I and Q values to DACs 24a and 24b (Op 408), so that the noise canceling process is controlled.

In this embodiment, however, the information that is obtained in Op 401 and indicates a terminal state is different. In this embodiment, the CPU 32 obtains, for example, "110 degrees" as an open/closed angle that is detected by the screen open/closed angle detection sensor 71 and formed between the display plane and the keyboard plane of the terminal 2 as a terminal state.

FIG. 8 illustrates one example of canceling effect data in this embodiment. In the canceling effect data illustrated in FIG. 8, canceling effect data, and I and Q values are recorded respectively for reception channels and screen open/closed angles. A state where the screen open/closed angle is "0 degree (Tablet)" is a case where a display of a computer device adopting a touch panel display is stacked onto a keyboard after rotated by 180 degrees to appear on a front surface, and the computer device is used without using the keyboard. Moreover, a state where the screen open/closed angle is "90 degrees (Laptop)" or "110 degrees (Laptop)" is a case where the computer device is normally used by using the keyboard while viewing the display. Specific examples of the screen open/closed angle are not limited to these cases.

In Op 402 of FIG. 4, the CPU 32 executes the noise canceling process based on the above described processes of Op 403 to Op 412 when it detects that the screen open/closed angle has changed from "110 degrees" to "0 degree". As a result, noise canceling for a reception signal can be suitably performed by using a noise signal of a reverse phase even if influences that an internal noise exerts respectively on reception antennas vary depending on the open/closed state of the display. Accordingly, even in a notebook computer device where a plurality of communication antennas are embedded in different positions of an outer frame of a display, a reception antenna that achieves a high noise canceling effect can be quickly and safely decided.

2-3. Modification Example

The above described embodiment refers to the example where the open/closed angle formed between the display plane and the keyboard plane is used as information about the relative position relationship between the display (movable portion) and the main body (fixed portion) in the notebook computer device. However, information other than the open/closed angle formed between the display plane and the keyboard plane may be used.

For example, if the display is configured to be rotatable about a rotational axis in a case where the terminal is a cellular phone or a small computer device, the above described noise canceling process may be executed by using a rotational angle of the display as the information about a relative position relationship.

Alternatively, for example, if the display (movable portion) is configured to be movable (able to slide) in parallel with respect to the main body (fixed portion), the noise canceling process may be executed by using the amount of a parallel move of the display as the information about a relative position relationship. In this case, the amount of the parallel move of the display may be detected, for example, with a sensor provided in the main body or the display.

Additionally, for example, if a reception antenna is configured to be rotatable or openable/closable in a case where the terminal has a reception antenna of terrestrial digital broadcasting, the noise canceling process may be executed by using a rotational angle or an open/closed angle of the reception antenna as the information about a relative position relationship.

In addition, for example, if the device is configured to be able to measure a distance between a display having a reception antenna and a main body in a case where the display and the main body of the terminal are physically separated, the noise canceling process may be executed by using the distance between the display and the main body as the information about a relative position relationship. In this case, the distance between the display and the main body may be calculated based on, for example, an infrared ray or the like transmitted/received between the display and the main body.

In short, the noise canceling process according to this embodiment is applicable to all devices the state of which physically changes. Namely, the above described noise canceling process can be effectively executed if a physical state change of part of a device can be obtained as information about a relative position relationship.

3. THIRD EMBODIMENT

The above described embodiments are configured so that the noise canceling process can be executed at all times. However, if a reception intensity of the wireless communication module 18 is high to a certain level, a communication speed, which is one index indicating a noise canceling effect, does not increase any more. This is because a communication can be performed at a highest communication speed if the reception intensity is high.

FIG. 12A illustrates a relationship between a communication speed and a reception intensity. In FIG. 12A, if the reception intensity is equal to or higher than a threshold value 2, the communication speed becomes constant even if the reception intensity increases. Alternatively, if the reception intensity is equal to or lower than a threshold value 1, the communication speed is reduced to 0 because a communication cannot be performed. Namely, the effect of the noise canceling process can be effectually achieved by turning on a noise canceler in a range from the threshold value 1 (a lower limit threshold) to the threshold value 2 (an upper limit threshold).

Accordingly, this embodiment refers to an example where a noise canceling process is executed in a case where a reception intensity obtained as communication quality information is within a threshold value range. Also a noise canceling control apparatus according to this embodiment can be configured with an electronic device such as a notebook computer device, a cellular phone, a PDA, or the like similarly to the first embodiment.

3-1. Functional Block, Apparatus Configuration and Hardware Configuration

One example of a functional block, an apparatus configuration, and a hardware configuration of the noise canceling control apparatus 1 according to this embodiment is basically similar to the first embodiment described with reference to FIGS. 1, 2, and 3.

Figure 9:
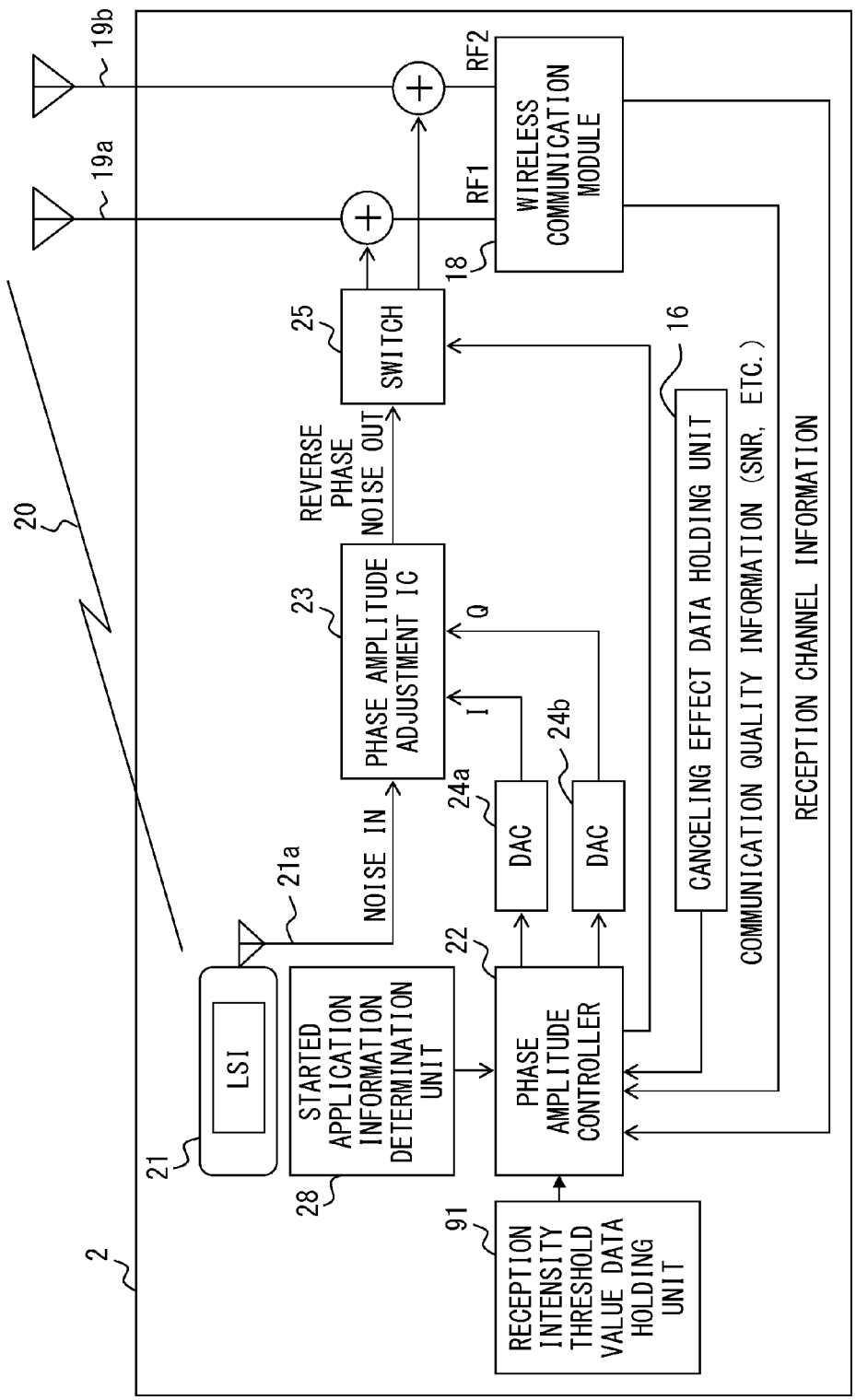
FIG. 9 illustrates one example of a device configuration of a terminal 2 (a notebook computer device) configuring a noise canceling control apparatus 1 according to the third embodiment of the present invention.

FIG. 9 illustrates one example of a device configuration of a terminal 2 (notebook computer device) configuring the noise canceling control apparatus 1 according to this embodiment of the present invention. In FIG. 9, a reception intensity threshold value data holding unit 91 is added to the configuration of FIG. 2. The reception intensity threshold value data holding unit 91 records a threshold value for determining whether or not a reception intensity of the wireless communication module 18 in the terminal 2 is within the threshold value range.

Figure 10:
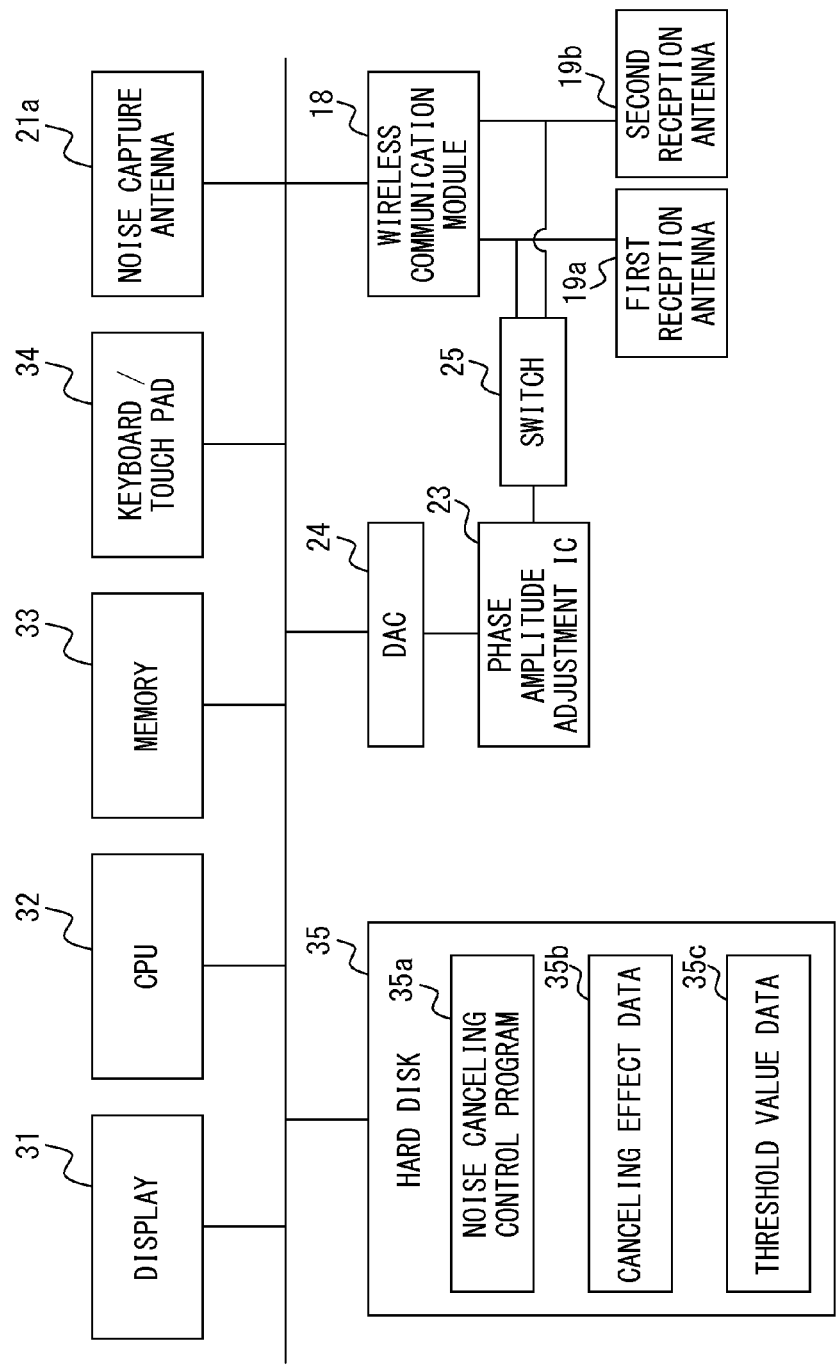
FIG. 10 illustrates an example of a hardware configuration of the terminal 2 that is illustrated in FIG. 9 and implemented by using a CPU.

FIG. 10 illustrates an example of a hardware configuration of the terminal 2 that is illustrated in FIG. 9 and implemented by using a CPU. In FIG. 10, threshold value data 35c is added within the hard disk 35 of FIG. 3. The threshold value data 35c respectively stipulates a lower limit threshold and an upper limit threshold in a case of determining whether or not the reception intensity is within the threshold value range. FIGS. 13A, 13B, and 13C respectively illustrate one example of the threshold value data 35c.

3-2. Contents of a Noise Canceling Control Process

Contents of the process of a noise canceling control program 35a in the terminal 2 according to this embodiment are basically similar to those of the first embodiment described with reference to FIG. 4. Namely, the first embodiment and the third embodiment are identical in that the CPU 32 obtains information indicating a terminal state (Op 401), determines whether or not the terminal state of the terminal 2 has changed (Op 402), and obtains current communication quality of the terminal 2 if the terminal state has changed (Op 403).

In this embodiment, however, the CPU 32 further obtains, for example, information about a reception intensity as the current communication quality in Op 403. The CPU 32 further obtains, for example, RSSI (Received Signal Strength indication) for each of the reception antennas (19a and 19b) in addition to SNR from the wireless communication module 18.

Additionally, in this embodiment, the CPU 32 obtains threshold value data (OP 403a) after obtaining the current communication quality in Op 403, and determines whether or not the reception intensity is within the threshold value range by using the obtained threshold value data (Op 403b). The CPU 32 obtains, for example, a record 131 of the threshold value data 35c in the form of a table illustrated in FIG. 13A. In this case, the CPU 32 obtains a threshold value 1 "5 dB" as a lower limit threshold indicating a lower limit of the reception intensity, and further obtains a threshold value 2 "15 dB" as an upper limit threshold indicating an upper limit of the reception intensity. In this case, the threshold value range of the reception intensity is "5 dB" to "15 dB".

If the CPU 32 determines that the reception intensity included in the current communication quality obtained in Op 403 is not within the threshold value range ("NO" in Op 403b), the process returns to the above described Op 401, in which the CPU 32 repeats the above described process. Alternatively, if the CPU 32 determines that the reception intensity included in the current communication quality obtained in Op 403 is within the threshold value range ("YES" in Op 403b), it turns on a power supply of the phase amplitude adjustment IC, which is a noise canceler (Op 403c). As a result, the processes in Op 404 to Op 412 can be executed similarly to the first embodiment.

After the CPU 32 determines that the noise canceling effect is as expected in the above described Op 410 or after the CPU 32 records I and Q values after adjusted as canceling effect data in association with the terminal state, it obtains a reception intensity from the wireless communication module 18 as one communication quality after the noise canceling (Op 413).

The CPU 32 determines whether or not the received reception intensity is within the threshold value range (Op 414). If the reception intensity is within the threshold value range, the process returns to the above described Op 413, in which the CPU 32 repeats the above described process ("YES" in Op 414). Alternatively, if the reception intensity is not within the threshold value range ("NO" in OP 414), the CPU 32 turns off the power supply of the phase amplitude adjustment IC, which is a noise canceler. If the value of RSSI of the reception antenna (19a or 19b) decided in the above described Op 406 is not within the threshold value range (5 dB to 15 dB), the CPU 32 turns off the power supply of the phase amplitude adjustment IC.

With the configuration referred to in this embodiment, the noise canceling process can be executed only if a noise effect can be expected by performing noise canceling.

3-3. Modification Example 1

In the above described Op 403a, the threshold value data illustrated in FIG. 13A is obtained to determine whether or not the reception intensity is within the threshold value range. However, for example, threshold value data illustrated in FIG. 13B may be obtained. FIG. 13B stipulates a threshold value range for each running application program. For example, a threshold value range (record 132) when a moving picture reproduction program is executed, and a threshold value range (record 133) when a browser program is executed are stipulated.

In this way, the noise canceling process can be precisely controlled by using a threshold value range according to a terminal state. For example, a control is performed such that a range of a reception intensity for which the noise canceling is to be performed is widened by setting a threshold value range to a wide range (for example, 5 dB to 20 dB) when a moving picture reproduction program is executed, and a range of a reception intensity for which the noise canceling is to be performed is narrowed by setting a threshold value range to a narrow range (for example, 5 dB to 15 dB) when a browser program is executed.

Note that the threshold value range may be stipulated for each terminal state other than a running application program. For example, the threshold value range may be stipulated for each reception channel number or each screen open/closed angle, or the threshold value range may be stipulated by combining a reception channel number and a screen open/closed angle.

3-4. Modification Example 2

In the above described Op 403a, the threshold value data illustrated in FIG. 13A is obtained to determine whether or not the reception intensity is within the threshold value range. However, for example, threshold value data illustrated in FIG. 13C may be obtained. FIG. 13C stipulates a threshold value range for each matter to which a higher priority is to be assigned at the time of noise canceling. For example, a threshold value range "5 dB to 20 dB" (record 134) when a higher priority is assigned to a communication speed, and a threshold value range "5 dB to 10 dB" (record 135) when a higher priority is assigned to power saving are stipulated.

Figure 12B:
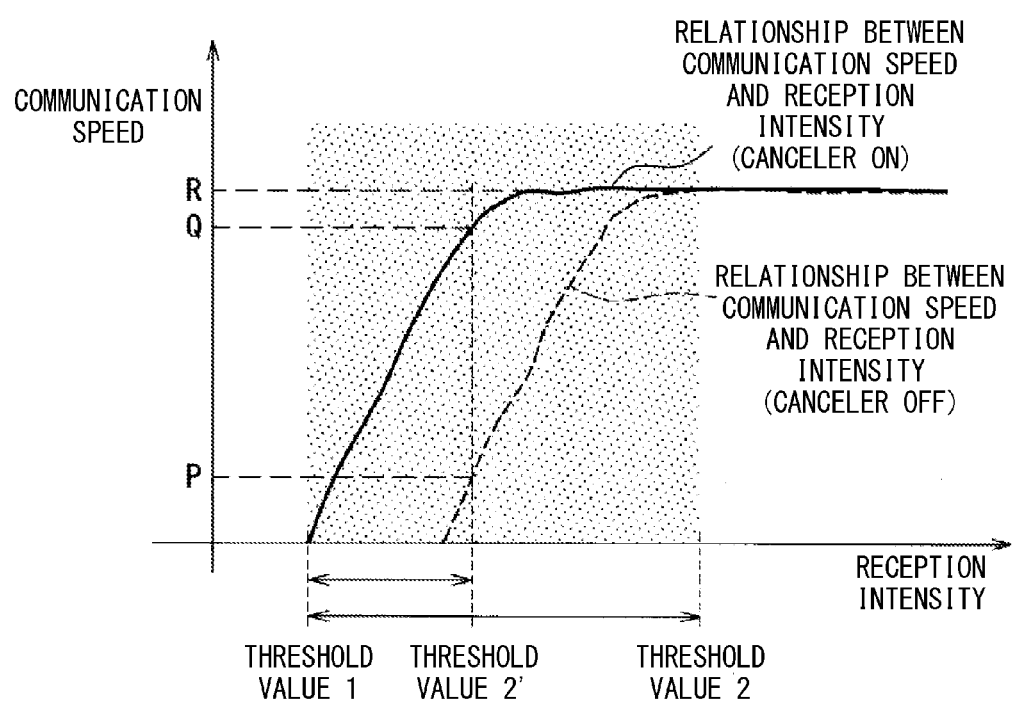
FIG. 12B illustrates a relationship between a communication speed and a reception intensity.

FIG. 12B illustrates a relationship between a communication speed and a reception intensity. In FIG. 12B, if the reception intensity is within a range from "threshold value 1 to threshold value 2'", the communication speed can be increased from P to Q by executing the canceling process. In contrast, if the reception intensity is within a range from "threshold value 1 to threshold value 2", the communication speed can be increased from P to R by executing the canceling process. In this case, even if the threshold value 2' is increased to the threshold value 2, a difference between the communication speeds Q and R is small.

Accordingly, the threshold value range is stipulated as "5 dB to 20 dB" as in the record 134 of FIG. 13C, whereby the communication speed can be increased up to R. Namely, a higher priority can be assigned to the communication speed. In contrast, by stipulating the threshold value range to be "5 dB to 10 dB" as in the record 135 of FIG. 13C, the communication speed can be kept at Q. Namely, a higher priority can be assigned to power saving of the apparatus than the communication speed by narrowing the threshold value range for which the noise canceling process is to be executed.

As a result, the noise canceling process can be precisely controlled by using a threshold value range according to a matter of priority. Note that the threshold value range may be stipulated for each matter of priority other than a communication speed and power saving as a matter of priority.

4. OTHER EMBODIMENTS

Two or more of the configurations referred to in the above described first to third embodiments may be partially or entirely combined.

The above described embodiment refers to the example where the browser is used as an application program and the canceling effect table created for each wireless LAN channel is used for a reception channel. If the application program is a terrestrial digital broadcasting reception program, a canceling effect table created for each broadcasting channel may be used.

The above described first to third embodiments refer to the configurations where the terminal includes the plurality of reception antennas. However, the embodiments may be configured so that the terminal includes only one reception antenna. FIG. 15 illustrates one example of a device configuration of a terminal 2 (a notebook computer device) configuring a noise canceling control apparatus 1 in a case where the terminal includes only one reception antenna. FIG. 16 illustrates one example of an operation chart of a noise canceling control process based on a noise canceling control program 35a in this case. FIG. 17 illustrates one example of canceling effect data in this case.

The process illustrated in FIG. 16 in this case is basically similar to that of FIG. 4. However, since only one reception antenna is included in the case of FIG. 16, it may calculate communication quality of one reception antenna in Op 405a.

As described above, even if one reception antenna is included, canceling effect parameters with which a canceling effect can be achieved are obtained, whereby a condition for achieving a noise canceling effect can be quickly decided.

In the above described embodiments, the functional blocks illustrated in FIG. 1 are implemented with the processes of the CPU that executes software. However, some or all of the functional blocks may be implemented by hardware such as a logic circuit and the like. Note that an operating system (OS) may be caused to execute some of the processes of the program.

With the disclosure of this specification, a condition for obtaining a noise canceling effect can be quickly decided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A noise canceling control apparatus for a terminal including a reception antenna, the noise canceling control apparatus comprising:
    a communication quality information obtainment unit configured to obtain information about current communication quality of the terminal;
    a terminal state obtainment unit configured to obtain a terminal state of the terminal in which a canceling process for a noise that occurs within the terminal is to be executed;
    a canceling effect data holding unit configured to make an association among at least a terminal state, canceling parameters used when the canceling process is executed for the noise that occurs within the terminal, and data indicating a degree of a canceling effect when the canceling process is executed by using the canceling parameters, and to record the terminal state, the canceling parameters, and the data;
    a canceling effect data obtainment unit configured to obtain, from the canceling effect data holding unit, canceling parameters and data indicating the degree of a canceling effect, which correspond to the obtained terminal state;
    a communication quality calculation unit configured to calculate communication quality when the canceling process is assumed to be executed for the terminal by using the obtained canceling parameters based on the information about the current communication quality, and the data indicating the degree of the canceling effect;
    a parameter output unit configured to output canceling parameters with which the calculated communication quality is predicted to be obtained; and
    a canceling processing unit configured to execute the canceling process for the noise that occurs within the terminal by using the output canceling parameters.

2. The noise canceling control apparatus according to claim 1, wherein
    the terminal includes a plurality of reception antennas;
    the canceling effect data holding unit makes an association among the terminal state, the canceling parameters, and the data indicating the degree of the canceling effect for each of the reception antennas, and records the terminal state, the canceling parameters, and the data for each of the reception antennas,
    the canceling effect data obtainment unit obtains the data indicating the degree of the canceling effect for each of the reception antennas,
    the communication quality calculation unit calculates the communication quality for each of the reception antennas,
    the noise canceling control apparatus further comprises:
        a reception antenna decision unit configured to decide a reception antenna that is predicted to enhance the calculated communication quality higher than the current communication quality is further comprised, wherein
    the parameter output unit outputs the canceling parameters to the canceling processing unit by using the decided reception antenna.

3. The noise canceling control apparatus according to claim 1, wherein
    the terminal state obtainment unit obtains, as the terminal state, information about a reception channel that the terminal uses for a wireless communication.

4. The noise canceling control apparatus according to claim 1, wherein the terminal state obtainment unit obtains information about a program running in the terminal as the terminal state.

5. The noise canceling control apparatus according to claim 4, wherein
Signal-to-Noise Ratio (SNR) at the time of a communication is used as the information about the communication quality.

6. The noise canceling control apparatus according to claim 1, wherein
the terminal includes a fixed unit and a movable unit,
the terminal state obtainment unit obtains information about a relative position relationship of the movable portion with respect to the fixed portion as the terminal state, and
the canceling effect data obtainment unit obtains canceling parameters, and data indicating the degree of a canceling effect based on the obtained information about the relative position relationship.

7. The noise canceling control apparatus according to claim 1, wherein
the communication quality information obtainment unit obtains a reception intensity at the time of a communication as the information about the current communication quality of the terminal, and
the parameter output unit outputs the canceling parameters to the canceling processing unit so that the canceling process is executed when the reception intensity is within a threshold value range.

8. The noise canceling control apparatus according to claim 7, the noise canceling control apparatus further comprising:
a reception intensity determination unit configured to determine whether or not the reception intensity is within the threshold value range by using a threshold value table that records a threshold value range for each terminal state.

9. The noise canceling control apparatus according to claim 8, wherein
the a reception intensity determination unit determines whether or not the reception intensity is within the threshold value range by using a threshold value table that records at least a threshold value range used when a higher priority is assigned to a communication speed, and a threshold value range used when a higher priority is assigned to power saving.

10. A computer-readable recording medium having stored therein a program for causing a computer to execute a noise canceling control process for use in a terminal including a reception antenna, the process comprising:
obtaining information about current communication quality of the terminal;
obtaining a terminal state of the terminal in which a canceling process for a noise that occurs within the terminal is to be executed;
obtaining canceling parameters and data indicating a degree of a canceling effect, which correspond to the obtained terminal state, from a canceling effect data holding unit configured to make an association among at least a terminal state, canceling parameters used when the canceling process is executed for the noise that occurs within the terminal, and data indicating the degree of a canceling effect when the canceling process is executed by using the canceling parameters, and to record the terminal state, the canceling parameters, and the data;
calculating communication quality when the canceling process is assumed to be executed for the terminal by using the obtained canceling parameters based on the information about the current communication quality, and the data indicating the degree of the canceling effect;
outputting canceling parameters with which the calculated communication quality is predicted to be obtained; and
executing the canceling process for the noise that occurs within the terminal by using the output canceling parameters.

11. A control method of a noise canceling process, executed by a computer, for a terminal including a reception antenna, the process comprising:
obtaining, by the computer, information about current communication quality of the terminal;
obtaining, by the computer, a terminal state of the terminal in which a canceling process for a noise that occurs within the terminal is to be executed;
obtaining, by the computer, canceling parameters and data indicating a degree of a canceling effect, which correspond to the obtained terminal state, from a canceling effect data holding unit configured to make an association among at least a terminal state, canceling parameters used when the canceling process is executed for the noise that occurs within the terminal, and data indicating the degree of a canceling effect when the canceling process is executed by using the canceling parameters, and to record the terminal state, the canceling parameters, and the data;
calculating, by the computer, communication quality when the canceling process is assumed to be executed for the terminal by using the obtained canceling parameters based on the information about the current communication quality, and the data indicating the degree of the canceling effect;
outputting, by the computer, canceling parameters with which the calculated communication quality is predicted to be obtained; and
executing, by the computer, the canceling process for the noise that occurs within the terminal by using the output canceling parameters.

\* \* \* \* \*

UNITED STATES PATENT AND TRADEMARK OFFICE
CERTIFICATE OF CORRECTION

| | | |
|---|---|---|
| PATENT NO. | : 8,666,348 B2 | Page 1 of 1 |
| APPLICATION NO. | : 13/734309 | |
| DATED | : March 4, 2014 | |
| INVENTOR(S) | : Itasaki et al. | |

It is certified that error appears in the above-identified patent and that said Letters Patent is hereby corrected as shown below:

In the Claims

Column 19, Line 40, In Claim 9, delete "the a" and insert -- the --, therefor.

Signed and Sealed this
Twenty-seventh Day of May, 2014

Michelle K. Lee
*Deputy Director of the United States Patent and Trademark Office*